(12) United States Patent
Wattenburg et al.

(10) Patent No.: US 7,631,950 B2
(45) Date of Patent: Dec. 15, 2009

(54) APPARATUS FOR STOPPING A VEHICLE

(75) Inventors: Willard H. Wattenburg, Walnut Creek, CA (US); David B. McCallen, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/062,159

(22) Filed: Feb. 18, 2005

(65) Prior Publication Data

US 2005/0146208 A1 Jul. 7, 2005

Related U.S. Application Data

(62) Division of application No. 10/291,275, filed on Nov. 8, 2002, now Pat. No. 7,191,862.

(60) Provisional application No. 60/340,494, filed on Dec. 14, 2001, provisional application No. 60/338,428, filed on Nov. 9, 2001.

(51) Int. Cl.
*B60T 17/16* (2006.01)

(52) U.S. Cl. .............................. 303/89; 303/7; 303/123; 188/353; 180/287

(58) Field of Classification Search ................... 303/89, 303/123, 15, 7; 188/353, 265; 180/287; 307/10.2
See application file for complete search history.

(56) References Cited

U.S. PATENT DOCUMENTS

| 1,502,145 | A | | 7/1924 | Kurtis |
| 1,618,880 | A | | 2/1927 | Johnson |
| 3,269,783 | A | | 8/1966 | Jack |
| 3,735,834 | A | | 5/1973 | St. Onge |
| 3,973,805 | A | * | 8/1976 | Stevenson et al. ............. 303/9 |
| 4,146,107 | A | | 3/1979 | Ebbeson et al. |
| 4,591,019 | A | | 5/1986 | Fisher et al. |
| 4,621,874 | A | * | 11/1986 | Gustafsson ................... 303/89 |
| 4,691,801 | A | | 9/1987 | Mann et al. |
| 4,793,661 | A | * | 12/1988 | Munro ......................... 303/89 |
| 4,873,824 | A | * | 10/1989 | Cox ............................. 60/545 |
| 4,964,485 | A | | 10/1990 | Meile |
| 4,991,681 | A | | 2/1991 | Paulson |
| 5,101,927 | A | | 4/1992 | Murtuza |

(Continued)

FOREIGN PATENT DOCUMENTS

DE 198 46 788 A1 6/2000

(Continued)

*Primary Examiner*—Robert A Siconolfi
*Assistant Examiner*—Mariano Sy
(74) *Attorney, Agent, or Firm*—Dorsey & Whitney LLP

(57) ABSTRACT

An apparatus for externally controlling one or more brakes on a vehicle having a pressurized fluid braking system. The apparatus can include a pressurizable vessel that is adapted for fluid-tight coupling to the braking system. Impact to the rear of the vehicle by a pursuit vehicle, shooting a target mounted on the vehicle or sending a signal from a remote control can all result in the fluid pressures in the braking system of the vehicle being modified so that the vehicle is stopped and rendered temporarily inoperable. A control device can also be provided in the driver's compartment of the vehicle for similarly rendering the vehicle inoperable. A driver or hijacker of the vehicle preferably cannot overcome the stopping action from the driver's compartment.

17 Claims, 18 Drawing Sheets

U.S. PATENT DOCUMENTS

| | | |
|---|---|---|
| 5,148,886 A | 9/1992 | Parsons |
| 5,154,493 A | 10/1992 | Futrell et al. |
| 5,170,858 A | 12/1992 | Chen |
| 5,351,781 A | 10/1994 | Pritchard et al. |
| 5,370,201 A * | 12/1994 | Inubushi ............... 180/287 |
| 5,378,929 A * | 1/1995 | Mor et al. ............... 303/89 |
| 5,392,876 A * | 2/1995 | Linares ............... 180/287 |
| 5,399,002 A | 3/1995 | Taylor |
| 5,413,197 A * | 5/1995 | Baer et al. ............... 188/353 |
| 5,431,487 A | 7/1995 | Poricelli |
| 5,528,216 A | 6/1996 | Main |
| 5,570,756 A * | 11/1996 | Hatcher ............... 180/287 |
| 5,595,258 A | 1/1997 | Georgas et al. |
| 5,747,886 A * | 5/1998 | Parr et al. ............... 307/10.2 |
| 5,842,364 A | 12/1998 | Oliver |
| 5,917,405 A | 6/1999 | Joao |
| 5,925,940 A | 7/1999 | Donatelle et al. |
| 5,933,075 A | 8/1999 | Ditson |
| 5,952,600 A | 9/1999 | Herr |
| 6,007,159 A | 12/1999 | Davis et al. |
| 6,124,805 A | 9/2000 | Gabbard |
| 6,164,730 A * | 12/2000 | Main ............... 303/89 |
| 6,176,519 B1 | 1/2001 | Limingoja |
| 6,232,884 B1 | 5/2001 | Gabbard |
| 6,338,534 B1 | 1/2002 | Kee et al. |
| 6,367,888 B1 * | 4/2002 | Kee et al. ............... 303/89 |
| 6,411,217 B1 | 6/2002 | Gabbard |
| 6,504,472 B2 | 1/2003 | Machala et al. |
| 6,505,101 B1 | 1/2003 | Brill |
| 6,634,721 B2 * | 10/2003 | Holt ............... 303/89 |
| 6,664,888 B1 | 12/2003 | Bishop |
| 6,723,225 B2 | 4/2004 | Scheps |
| 2003/0006644 A1 | 1/2003 | MacGregor et al. |
| 2003/0052532 A1* | 3/2003 | Costello et al. ............... 303/7 |

FOREIGN PATENT DOCUMENTS

| | | |
|---|---|---|
| GB | 2 247 727 A | 11/1992 |
| GB | 2 266 611 A | 11/1993 |
| WO | WO 91/11348 | 8/1991 |

* cited by examiner

APPARATUS FOR STOPPING A VEHICLE

CROSS REFERENCE TO RELATED APPLICATIONS

This application is a divisional of U.S. patent application Ser. No. 10/291,275 filed Nov. 8, 2002, now U.S. Pat No. 7,191,862 which claims the benefit of U.S. Provisional patent applications No. 60/338,428 filed Nov. 9, 2001 and No. 60/340,494 filed Dec. 14, 2001, the entire contents of both are incorporated herein by reference.

SCOPE OF THE INVENTION

This invention relates generally to an apparatus for stopping a vehicle moving on a road and, more specifically, an apparatus mountable on a vehicle for applying the brakes of the vehicle to decelerate and stop the vehicle.

BACKGROUND OF THE INVENTION

Hijacked vehicles, such as trucks, are a potentially significant threat to public safety. The potential damage from an explosive or fuel laden truck or other vehicle is great.

A loaded truck is very difficult to stop through external means such as barriers, spikes and patrol cars. Trucks may be damaged through the use of these means but because of momentum may be able to continue on route for a significant distance. Pursuing police officers put themselves in great danger to attempt to shoot either the tires or the driver of a speeding truck. Shooting the hijacker driver, when possible, can result in great danger to the public. Shooting the tires, when possible, is generally not effective because trucks can continue for long distances with a few punctured tires. Either measure typically causes the vehicle to loose control, which may cause the vehicle to detonate in an undesirable location resulting in significant loss of property and life. Law enforcement agencies do not have a workable and safe solution to halt hijacked trucks or other vehicles that can be carried out with the tools and training the agencies have at hand.

BRIEF SUMMARY OF THE INVENTION

An apparatus for externally controlling one or more brakes on a vehicle having a pressurized air or other fluid braking system to halt the vehicle is described. The apparatus can include a pressurizable vessel that is adapted for fluid-tight coupling to the braking system. Light or other impact to the rear of the vehicle by a pursuit vehicle such as an ordinary police patrol car, shooting a target mounted on the vehicle or sending a signal from a remote control can all result in the fluid pressures in the braking system of the vehicle being modified in such a way that the vehicle is stopped and rendered temporarily inoperable. A control device can also be provided in the driver's compartment of the vehicle for similarly rendering the vehicle inoperable. A driver or hijacker of the vehicle preferably cannot overcome the stopping action from the driver's compartment of the vehicle.

DETAILED DESCRIPTION OF THE INVENTION

Figure 1:
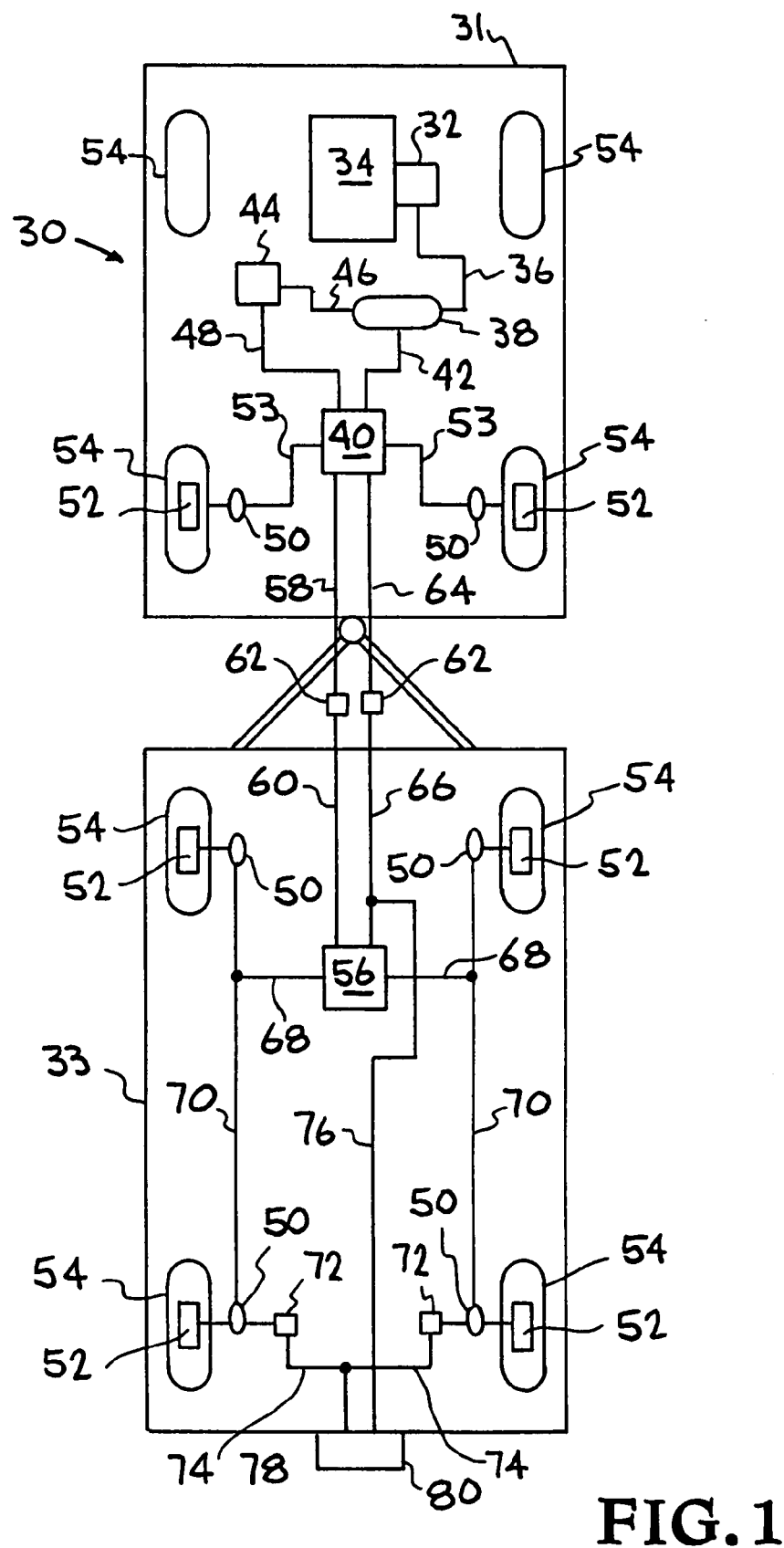
FIG. 1 is a schematically illustrated tractor trailer showing a braking system incorporating a first type vehicle stopping apparatus (VSA).

An apparatus for stopping and/or disabling a vehicle through the application of the vehicle's braking system is described along with a braking system incorporating the apparatus and a method of using the apparatus. In one preferred use, the apparatus is utilized with over the road trucks, especially those having a tractor and one or more trailers attached to the tractor. Several embodiments of the invention apply the brakes via a truck trailer's primary and emergency braking systems simultaneously, although other preferred embodiments activate one or the other of the primary braking system and/or the emergency braking system. Further, embodiments of the apparatus can be utilized with any type of road going vehicle that utilizes a pressurized pneumatic or hydraulic braking system.

The apparatus of the present invention comprises any device or means that facilitates the remote application of the braking system of a vehicle and is referred to herein as a vehicle stopping apparatus (VSA). The VSA can be at least partially mounted to the rear end of a truck or truck's trailer wherein it causes the truck's brakes to be applied when it is lightly impacted or otherwise struck one or more times with sufficient force by the impact of a pursuing vehicle against it or by the impact from a projectile from weapon's fire. The VSA can also incorporate an electromagnetic signal receiver with an associated controller necessary to facilitate the application of the braking system when signaled by a remote transmitter. Further, another VSA can be actuatable only through electromagnetic signals, such as radio or laser signals, from a remote transmitter without utilizing an impact means. Preferably, once activated the VSA cannot be overridden by the driver of the truck without stopping and leaving the cab to either reset or repair the VSA and braking system. The VSA can be actuated by an authorized driver of a vehicle so as to render the vehicle inoperable. Portable versions of the VSA can easily be attached to any vehicle that does not have a permanently installed VSA.

Tractor trailer rigs in the United States typically employ pneumatic or hydraulic fluid braking systems or combinations of both. The normal service or operational brake system on a tractor trailer rig is actuated by the driver who causes increasing air or fluid pressure to be applied to the service braking mechanisms by pressing the brake pedal. However, the emergency brakes on such rigs are designed such that they are automatically applied by the braking system when there is a loss of pressure in the service braking system. The driver can do nothing to stop the automatic application of emergency brakes. Emergency brakes, once applied, are only released when sufficient pressure has been restored in the service braking system.

Tractor trailer rigs are required to have one or more emergency braking subsystems that will automatically apply the brakes to one or more axles of the tractor and/or the trailer when the pressure level in the fluid or pneumatic braking system's supply line(s) falls below a minimum level necessary for safe operation of the rig. These emergency braking subsystems can also be actuated by the truck operator from the tractor's cab by using standard control valves mounted in the cab. Accordingly, the emergency braking subsystem can also serve as the rig's parking brake system.

Referring to FIG. 1, a schematical view of a pneumatic braking system and emergency brake subsystem of a typical truck 30 having a tractor 31 and a trailer 33 is illustrated. An air compressor 32 that is coupled to the tractor's engine 34 generates the pressurized air necessary for the operation of the rig. The pressurized air is pumped via a supply line or conduit 36 to a pressurized air holding tank 38. The holding tank is in fluid communication with the primary braking control valve assembly 40 via a first primary supply line 42. Additionally, the tank is fluidly connected to a foot pedal valve 44 via another supply line 46. The foot pedal valve in turn is fluidly connected to the primary tractor braking control valve assembly 40 through a first pedal valve supply or control line 48. Operationally, pressing the foot pedal causes air of increasing pressure, dependent on how much the pedal is pressed, to be delivered to the primary braking control valve assembly 40. The brake control valve delivers pressurized air to the tractor brake pots 50 through the brake pot supply lines 53, wherein the pressure of the air being delivered is dependent on the pressure of the air provided to the braking control valve assembly from the pedal valve. The brake pots 50 of the tractor activate the braking mechanisms 52 contained at the applicable wheels 54 with which they are mechanically coupled. The braking mechanisms can include, but are not limited to, drum and disk brake assemblies. The tractor braking control valve assembly can also incorporate more advanced functions such as antilock controls or means wherein the distribution to the braking mechanisms is at least partially apportioned based on the rotation of the associated wheel. For instance, if there is an indication of wheel slippage on the road surface, the braking control valve assembly will reduce the air delivered to the associated brake pot until the wheel regains traction.

Pressurized air from the pedal valve 44 is also delivered to the trailer braking control valve assembly 56 through the primary braking control valve assembly 40, a second pedal valve control line 58, and a third pedal valve control line 60, wherein the second and third pedal valve control lines are typically connected through Gladhand or other connectors 62. Both the second and third pedal valve control lines 58 and 60 are extensions of the first pedal valve control line 48 and, accordingly, carry air that is pressurized to substantially the same level as that contained in the first pedal valve supply line 48 when the foot pedal valve 44 is activated. However, braking control valve assembly 40 may deliver more air pressure to lines 58 and 60 than exists in line 48 in order to apply more braking force to the trailer 33 than to the tractor 31.

Fully pressurized air is delivered to the trailer braking control valve assembly 56 from the first primary supply line 42 through the primary braking control valve assembly 40, the second primary supply line 64 and the third primary supply line 66, wherein the second and third primary supply lines are also typically connected through a connector 62. Both the second and third primary supply lines are extensions of the first primary supply line and accordingly, carry fully pressurized air. In a manner similar to the operation of the primary braking control valve assembly, the trailer braking control valve assembly delivers pressurized air to the trailer's brake pots based on the pressure of the air received through the third pedal valve supply line 60. The brake pots 50, which are coupled to the trailer braking control valve assembly 56 through brake pot supply lines 68 and 70, activate the associated brake mechanisms 52 to which they are coupled. As with the primary braking control valve assembly 40, the trailer braking control valve assembly 56 can also incorporate advanced features such as antilock control.

Most newer tractors and trailers have emergency braking subsystems that utilize conventional means such as spring brake pots 72 to mechanically activate associated brake pots 50 which are automatically activated in emergency situations or manually activated for parking the vehicles. The spring brake pots typically contain a mechanical biasing mechanism, such as a spring (not shown), that is activated when the pressure in associated spring brake air line(s) 74 drops below a predetermined level, thereby applying the associated braking mechanisms 52 through the brake pots 50. The spring brake air lines 74 are typically fluidly coupled with shunt lines or conduits 76 and 78 that are coupled to one of the primary air supply lines such as line 66. Accordingly, if pressure is lost in any one of the primary air supply lines, the pressure level will simultaneously drop in the spring brake air lines 74, thereby releasing the biasing mechanism which mechanically causes the spring brake pots 72 to activate the associated braking mechanisms 52. It is to be appreciated that by providing a release valve (not shown) fluidly coupled with the shunt line 74 in the cab of the tractor, an operator may engage the emergency braking subsystem as desired. If utilized when the vehicle is stopped, the spring brake pots permit the emergency braking system to be utilized as a parking brake.

In the first preferred embodiment of the invention, a first type of VSA 80 is installed between the shunt lines 76 and 78 that feed pressurized air to the spring brake pots 72 so that they are not activated when the truck is operating normally. Operationally, a first type VSA is a device or means configured to exhaust any pressurized air contained in either or both of the shunt lines 76 and 78, that is in the emergency spring braking system of the vehicle, when remotely activated. In the first preferred embodiment, such remote activation is achieved by an impact of sufficient force against the VSA. Preferably, at least a portion of the VSA 80 is mounted on the rear of a tractor or trailer, such as a bumper, where it may be easily impacted and where it cannot be repaired or reset without the vehicle operator having to leave the tractor or other operation compartment of the vehicle. Various embodiments of the first type VSA are described in greater detail below.

Figure 2:
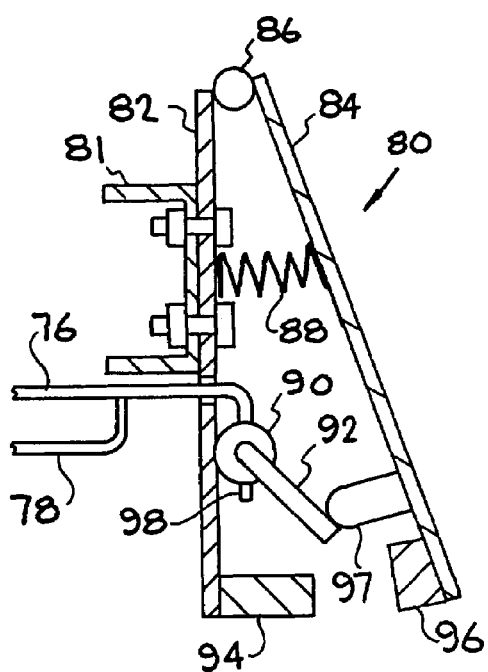
FIG. 2 is a side view of an embodiment of a first type VSA for mounting on a bumper of a vehicle.
Figure 3:
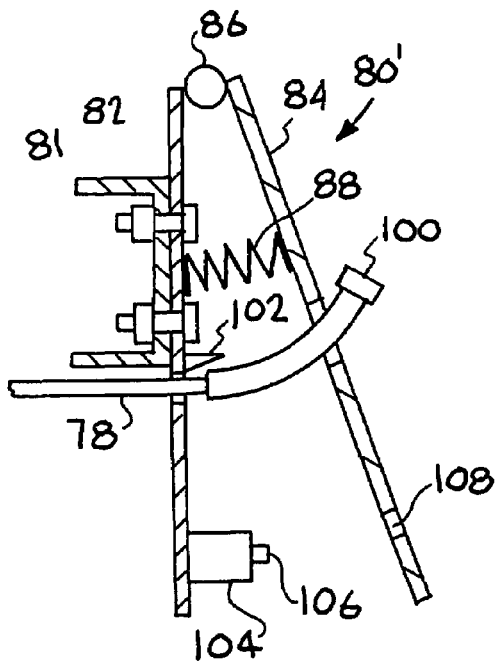
FIG. 3 is a side view of another embodiment of a first type VSA for mounting on a bumper of a vehicle.
Figure 4:
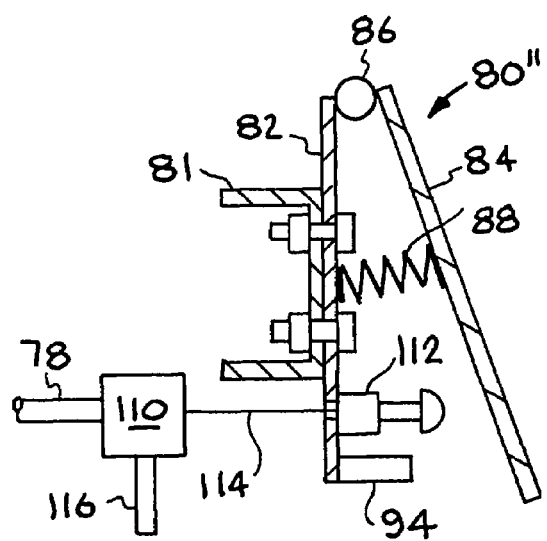
FIG. 4 is a side view of yet another embodiment of a first type VSA for mounting on a bumper of a vehicle, wherein the pressure release valve of the VSA is located within the chassis of the vehicle.

FIGS. 2, 3, and 4 illustrate different first type VSA embodiments that are mountable to the bumper 81 of a vehicle and utilize a hinged impact plate configuration to exhaust the air in associated spring brake shunt lines 76 and/or 78. Each includes mounting plates 82 for connection with a bumper. Each are pivotally connected to an impact plate 84 along their top edges by way of a hinge 86. Other types of movable members can be used as well. The plates are typically fabricated from steel although aluminum or other materials could be utilized as well. A spring 88 is provided to position the impact plate away from the mounting plate a predetermined distance. Further, the spring, which can comprise any suitable design such as a coil or leaf spring, is sufficiently stiff to prevent the impact plate from pivoting about the hinge when subject to incidental contact. In a preferred configuration, the spring load required to fully compress the impact plate is at least 200 lbs.

Referring to FIG. 2, the first embodiment of a first type VSA 80 includes a brake actuation device such as a lever operated ball valve 90 mounted on the mounting plate 82 with a lever 92 extending from the valve downwardly and towards the back surface of a remotely operable mechanism such as an impact plate 84. The valve is adapted for fluidly coupling to the shunt lines of the braking system, such as shunt lines 76 and/or 78 of tractor trailer 30. Proximate the bottom edges of the impact and mounting plates respective stop blocks 94 and 96 are mounted to the facing surfaces of the plates. The blocks prevent the impact plate from being pushed too far and causing damage to the lever valve. In its first (or home) position as shown in FIG. 2, the valve lever 92 is in the closed position preventing pressurized air in the coupled shunt lines 76 and/or 78 from exhausting. When the impact plate is hit with sufficient force, such as might result from the bumper or other implement of a law enforcement vehicle striking the impact plate, the impact plate pivots towards the mounting plate 82 to a second or actuated position. Lever push block 97 that is attached to the impact plate, moves the end of the lever 92 towards the mounting plate and downwardly, thereby rotating the valve from the closed position to an open position wherein the pressurized air from the shunt lines 76 and/or 78 is exhausted out of the valve's exhaust port 98. As described above for tractor trailer 30 of FIG. 1, the emergency braking subsystem is activated to decelerate and stop the truck. The truck can not be operated by the driver until valve 90 in VSA 80 is reset to the normal position.

VSA 80 is normally mounted on a truck or trailer bumper so that any standard police patrol car can easily impact the impact plate 84. Large numbers of law enforcement officers drive ordinary passenger cars with no special bumper equipment. Any one of these law enforcement officers may be called upon to stop a hijacked truck at any time. To minimize the probability of undesirable activations of the first type VSA, several other solutions are possible. For instance, the VSA can be mounted in high or lower positions wherein the bumper of a typical vehicle can not easily impact the VSA by bumping the VSA equipped vehicle. To facilitate activation of repositioned VSA by law enforcement officials, law enforcement vehicles can be equipped with an activation fixture that includes a ram or other appropriate implement attached thereto to impact the VSA. This fixture (not shown) can be permanently affixed to law enforcement vehicles or it could be removeably attached when the need arises.

In a second embodiment first type VSA 80' shown in FIG. 3, a section of the shunt line or conduit 78 is extended through the mounting plate 82 and the impact plate 84 and is capped by a plug 100 on its end to prevent the leakage of air therefrom. Preferably, the line is also fixedly secured to both the mounting and impact plates. Additionally, it is desirable that the section of the shunt line 78 passing through the VSA may be of a suitable material to facilitate its cutting, breaking or puncturing when the VSA is impacted. A knife edge 102 is preferably installed on plate 82 so that conduit 78 is cut cleanly when impact plate 84 is moved forward by impact. Suitable materials for conduit 78 are rubber or plastic hose that can be cut cleanly to provide a large opening for air to escape rapidly from cut conduit 78. A cut conduit 78 made of rubber or plastic can be easily repaired in the field by simply reinstalling cap 100 on the cut end. However, the truck driver must get out of the cab of the truck to make such repairs. Once breached, the pressurized air in line 78 is released and the emergency braking system is activated.

By mounting the first type VSA on the bumper of a truck or other vehicle, it is conceivable that someone other than law enforcement officials could accidentally or even purposefully activate the VSA. Police may desire evidence of those vehicles that either intentionally or accidentally activate another vehicle's VSA and then leave the scene. Accordingly, a marking device or indicator means is provided on VSA 80'. The marking device comprises a crushable container 104 that is mounted to the mounting plate 82 and includes a nozzle 106 facing generally outwardly. The container is typically filled with a dye or paint for marking the impacting vehicle. When the impact plate 84 is pivoted inwardly by an impact, it crushes the container sending dye or paint from the nozzle, through a nozzle hole 108 in the impact plate and onto the impacting vehicle. A marking system of similar construction can be used on all VSA embodiments that are activated by rear impact.

In a third embodiment first type VSA 80" shown in FIG. 4, a pressure release valve 110 is not mounted within the impact and mounting plates 84 and 82. Rather, the brake actuation device includes a transducer 112 mounted between the plates and electrically, mechanically, pneumatically or hydraulically connected to a pressure release valve 110 mounted within the chassis of an associated vehicle. By mounting the release valve in the chassis, modifying or tampering with the valve becomes more difficult and time consuming reducing the chances that a potential hijacker can disable the VSA before taking to the road. Further, the risk of damage to the valve is also reduced, as it is removed from the bumper of the vehicle where it would have been subjected to the elements. Operationally, when the impact plate is pivoted forwardly the transducer 112 is activated. The transducer then sends a signal to the valve through conduit 114 and/or wire connecting the valve with the transducer causing the valve to switch from a closed to open position thereby exhausting an attached shunt line 78 through an exhaust port 116.

Figure 5:
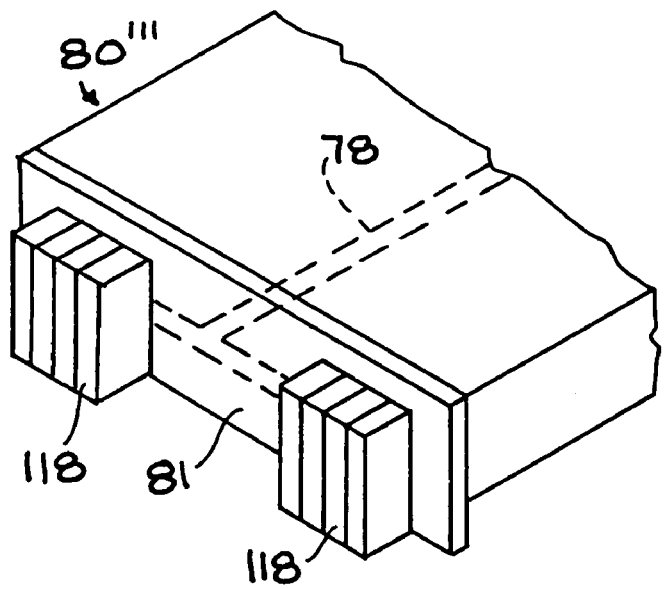
FIG. 5 is an isometric view of a fourth embodiment of a first type VSA for mounting on a bumper of a vehicle, wherein the VSA includes at least one pressurized vessel.

A fourth embodiment first type VSA 80''' is illustrated in FIG. 5 that is mountable on a bumper of a vehicle but does not utilize the hinged impact plate configuration of the first three first type VSA embodiments 80, 80' and 80". Rather, the fourth embodiment VSA 80''' comprises one or more pressurized vessels 118 that are fluidly coupled with sections of the shunt lines 76 or 78. In a preferred configuration, the pressure vessels are similar to small oil cooler radiators that can withstand pressures upwards of 200 psi, but can be relatively easily crushed and punctured when hit by a chase vehicle or when hit by a projectile such as from weapons fire. Once punctured, the shunt line 78 is exhausted and the emergency brakes are applied as described above for the braking system of the tractor trailer 30 of FIG. 1.

As will be described below, all the vehicle stopping apparatus in FIGS. 2, 3, and 4 can also be used to apply the regular service brakes as well as the emergency brakes of a vehicle such as a truck 30 shown in FIG. 1.

Figure 6:
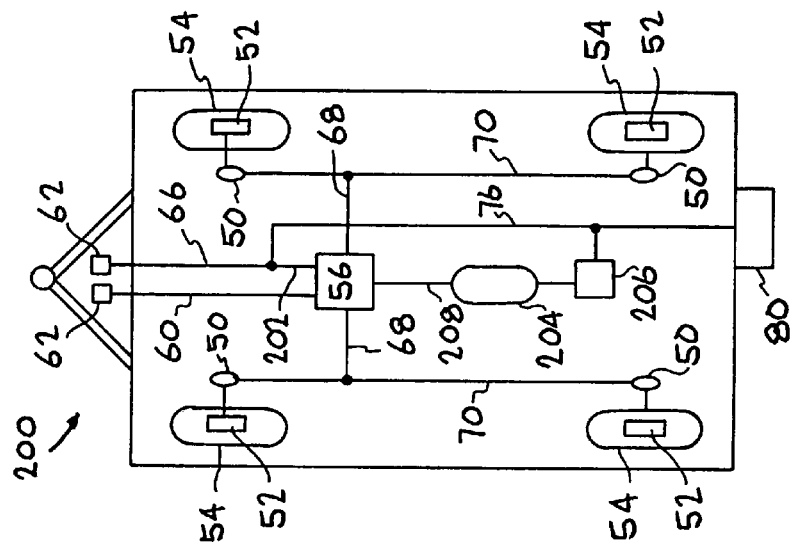
FIG. 6 is a schematically illustrated tractor trailer showing an older-style braking system further incorporating a first type VSA.

Many older tractor trailer rigs do not utilize the spring brake pot of more modern rigs. Rather, they utilize an emergency braking system based upon a reserve supply of pressurized air that is supplied to the brake pots 50, if the pressure within the primary supply lines drops below a predetermined level. A schematical representation of the braking system of an older style trailer 200 is illustrated in FIG. 6. Pressurized air is provided to the trailer braking control valve assembly 56 through the third primary supply line 66 and a primary supply shunt line 202. Pressurized air from the foot pedal valve 44 is received by the trailer braking control valve assembly 56 through the third pedal valve control line 60. Based on the pressure of the air received from the third pedal valve supply line, air pressurized to a level proportional to the air from the third pedal valve supply line 66 is provided through brake pot supply lines 68 and 70 to the respective brake pots 50 thereby causing the braking mechanisms 52 to be activated.

The old-style emergency braking subsystem shown in FIG. 6 comprises an emergency reserve air tank 204 that is fluidly coupled to the third primary supply line 66. A one way check valve 206 is provided inline with the third primary supply line 66 just upstream of the reserve air tank 204. The valve permits air to flow into the tank but does not permit pressurized air to flow out of the tank back to the third primary supply line 66. Accordingly, if the primary supply lines are depressurized, the reserve air contained in the pressurized reserve air tank 204 remains under pressure. A reserve tank air supply line 208 extends from the reserve tank 204 to the trailer braking control valve assembly 56 to supply pressurized air to the emergency braking system when required.

Operationally, when the pressure of the air in the primary supply line 66 drops below a predetermined level, the trailer braking control valve assembly 56 automatically directs pressurized air from the emergency reserve tank 204 to the brake pots 50 through the associated supply lines 68 and 70, thereby effectively activating the braking mechanisms 52. The emergency braking mechanism will remain activated until the air in the primary supply line 66 is restored to its minimum operational pressure level, usually at least 60 psi. As with the spring brake pot based emergency braking subsystem of truck 30, an operator of the truck hauling trailer 200 may cause the emergency braking subsystem of FIG. 6 to be activated by exhausting the air in the primary supply lines through a release valve (not shown) typically provided in the tractor's cab. Accordingly, the emergency braking subsystem can also be utilized as a parking brake system.

Any one of the first type VSA embodiments 80, 80', 80" and 80''' can be fluidly connected to the third primary supply line 66 upstream of the one-way check valve 206 through the supply shunt line 76. Accordingly, when the first type VSA is activated in any suitable manner, the pressurized air in the primary supply lines 42, 64, and 66 is exhausted, causing the pressure in the primary lines to drop. Once the pressure has dropped a predetermined amount, the trailer braking control valve assembly 56 directs air from the emergency reserve tank 204 to the brake pots 50, thus causing the brake pots 50 and the associated braking mechanisms 52 to be activated.

In many tractor trailer rigs the emergency braking subsystem is only applied to a fraction of the vehicle's total number of axles. In tractor trailer 30 of FIG. 1, for example, only the rearmost axle has the emergency braking feature. Accordingly, the distance required to stop a truck is potentially greater than when the tractor trailer's braking mechanisms on all wheels are applied by the foot pedal valve 44. In the braking system of trailer 300 of FIG. 7, a second type VSA 380 is utilized in conjunction with a modified trailer braking control valve assembly 334 so that both the emergency braking subsystem and the primary service brakes, preferably on all wheels, are applied simultaneously to maximize the stopping power and minimize the stopping distance. It is to be appreciated that a similar braking control valve assembly could be utilized in the tractor portion of a rig to ensure that activation of the second type VSA applies the tractor's brakes as well. The second type VSA 380 advantageously is configured to exhaust pressurized air from the spring brake pots 72 and also redirect maximum supply air pressure to the braking control valve assembly to apply the service brakes of the vehicle.

Figure 7:
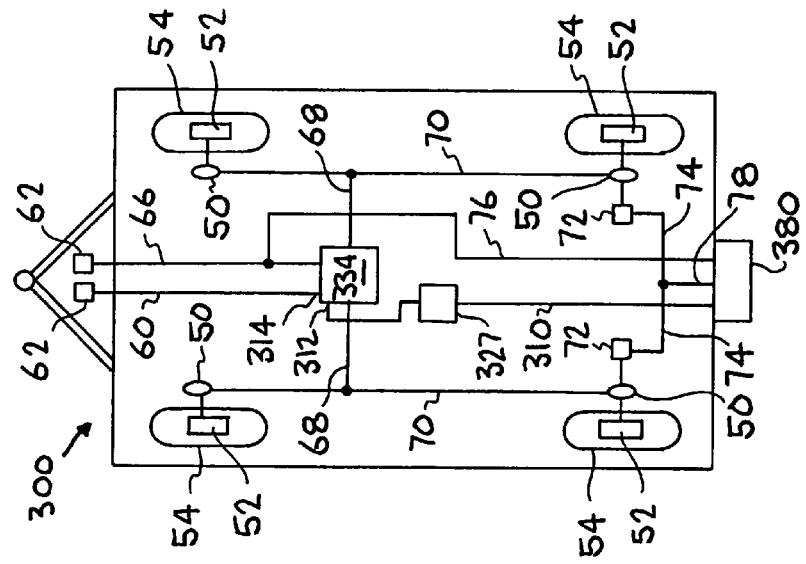
FIG. 7 is a schematically illustrated tractor trailer showing a braking system utilizing a second type VSA.

The second type VSA 380 of trailer 300 in FIG. 7, in a manner similar to the first type VSA 80, causes the pressurized air provided to the spring brake pots 72 through shunt line 78 and spring brake supply lines 74 to be exhausted, thereby releasing the biasing mechanism in the spring brake pots 72 to activate associated braking mechanisms 52 by acting through the brake pots 50.

In the braking system of trailer 300 in FIG. 7, the third pedal valve control line 60 is fluidly coupled with the trailer braking control valve assembly 334 through the first control port 314. Another service brake activation control line 310 extends between the second type VSA 380 and the trailer braking control valve assembly 334. Line 310 is coupled with the trailer braking control valve assembly 334 through a second control port 312. Line 310 allows the VSA 380 to activate the trailer's service brakes, that is not only the braking mechanisms 52 operable by spring brake pots 72 but also other and preferably all of the other braking mechanisms 52 of the vehicle, just as the driver can activate the service brakes with the pedal valve in the cab of the truck. As described above concerning trailer 30 in FIG. 1, the pressure level of the air directed from the braking control valve assembly to the brake pots 50 through the brake pot supply lines 68 and 70 is dependent on the pressure of the air supplied to the braking control valve assembly 334 through the first control port from the third peddle valve control line 60. The second control port 312 is similarly connected to the trailer braking control valve assembly 334 in a manner similar to the first control port, wherein the pressure level in the air passed through the port from the service brake activation supply line 310 determines the pressure level of the air supplied to the brake pots.

Operationally, when the second type VSA 380 is activated the pressurized air from the shunt line 76 is directed through the VSA and the brake activation supply line 310 and into the second control port 312. The trailer braking control valve assembly 334 then supplies pressurized air to the associated brake pots 50 to apply the associated braking mechanisms 52. Since the pressurized air is routed from a primary air supply line 66, the air supplied to the trailer braking control valve assembly is at its full (or maximum) operating pressure. Accordingly, the service braking mechanisms 52 on all wheels will be applied with maximum force, the same force as when an operator fully depresses the brake foot pedal valve 44 to slam on the brakes.

In a standard air brake system, the air in the pedal valve control lines 48, 58, 60 in FIG. 1 is normally exhausted to atmosphere when the foot pedal valve 44 is not being depressed. No residual pressurized air remains in these lines that could act to cause the braking control valve assembly 334 to continue to activate the braking mechanisms once an operator is no longer pushing the pedal valve 44. The exhaust port for the pedal control lines is typically located within the associated pedal control valve. Accordingly, it is not possible to directly connect the VSA brake activation line 310 into the third pedal valve control line 60, since any pressurized air passing through the VSA brake activation line 310 would simply flow out of the pedal valve exhaust port through the pedal valve supply line 62 and not activate the braking system as desired.

Figure 8:
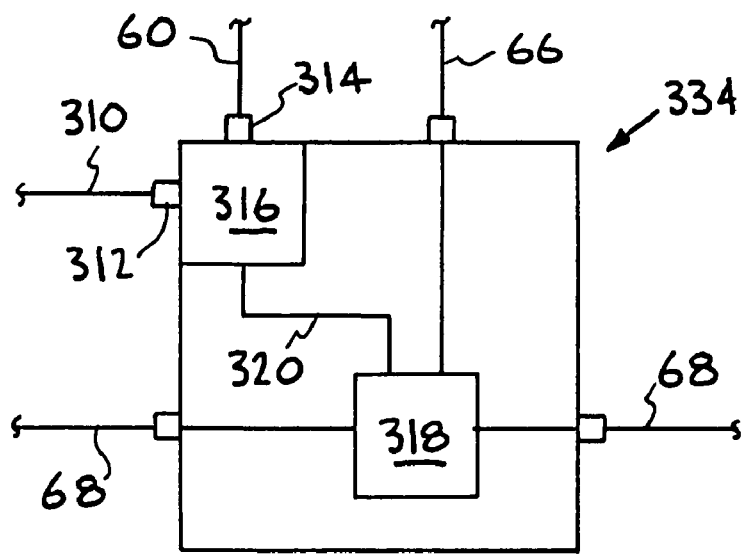
FIG. 8 diagrammatically illustrates the trailer braking control valve assembly utilized in the braking system of FIG. 7.

A schematical representation of one preferred trailer braking control valve assembly 334 for use with the braking system of trailer 300 of FIG. 7 is shown in FIG. 8. The braking control valve assembly 334 is part of the brake actuation device and incorporates a shuttle valve 316 connected with the first and second control ports 314 and 312. The shuttle valve 316 isolates line 310 from pedal valve control line 60 so that air pressure in line 310 cannot be exhausted by line 60. It acts to direct either the air from the foot pedal valve supply line 60 or the brake activation supply line 310 to the pressure apportioning valve hardware 318 of the control valve 334 through an internal air passage 320. Normally, the shuttle valve 316 permits pressurized air of varying pressures to pass therethrough as received through the first control port 314. However, when air of sufficient pressure is provided through the second control port 312, the connection between the first control port and other parts of the trailer braking control valve assembly 334 is closed. Accordingly, the actions of the operator relative to the brake foot pedal valve 44 have no effect on the control of the braking system by the VSA through line 310.

Figure 9:
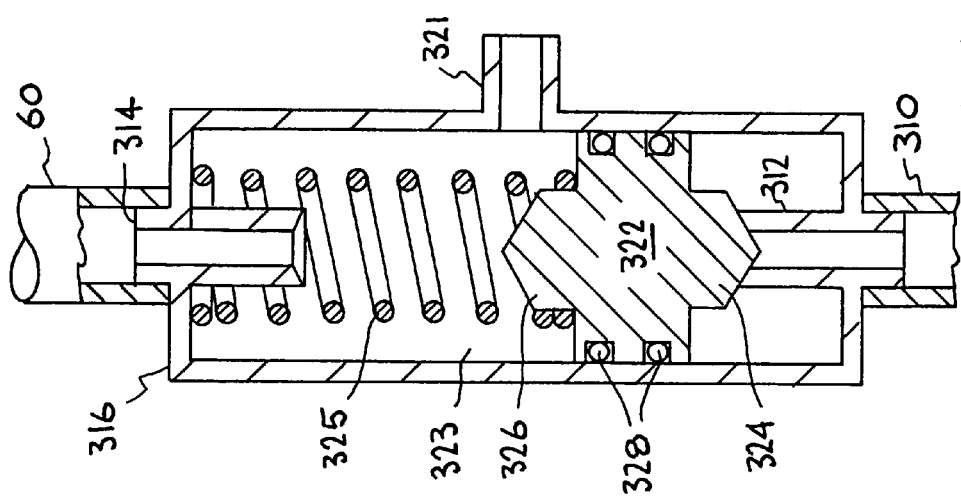
FIG. 9 is a cross-sectional view of a shuttle valve as utilized in the trailer braking control valve assembly of FIG. 8, which illustrates the shuttle valve in its rest position.
Figure 10:
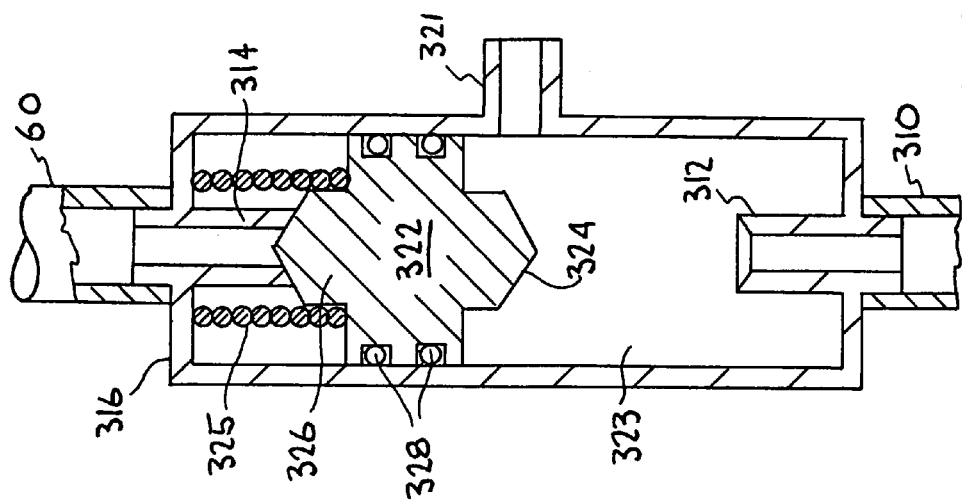
FIG. 10 is a cross-sectional view of a shuttle valve as utilized in the trailer braking control valve assembly of FIG. 8, which illustrates the shuttle valve in its activated position.

Shuttle valve 316 is illustrated in its normal and VSA-activated position in FIGS. 9 and 10, respectively. The shuttle valve comprises a shuttle member 322 slidably contained within a cylindrical cavity 323. The shuttle member has a plunger protrusion 324 and 326 extending from each of the top and bottom sides thereof. Three ports are provided into the cavity: the aforementioned first control port 314 at one end of the cavity; the aforementioned second control port 312 at the other end; and an outlet port 321 in a sidewall of the cavity 323 coupled with the internal air passage 320 shown in FIG. 8. Pressure seals 328 are provided between the surface of the shuttle member and the sidewall of the cavity to prevent the passage of pressurized air from one side of the shuttle member to the other. Further, a spring 325 is provided within the cavity and is configured to actively bias the bottom side of the plunger 324 into the second control port 312 to seal the second control port as shown in FIG. 9. In the normal configuration of shuttle valve 316 shown in FIG. 9, pressurized air from the pedal valve control line 60 flows freely from the pedal valve 44 through outlet port 321 and passage 320 to the pressure apportioning valve hardware 318 of FIG. 8.

When the second type VSA 380 is activated as shown in FIG. 10, air line 310 supplies full operating pressure into the shuttle valve 316 pushing the shuttle member 322 upwardly to seal the first control port 314 This permits maximum pressurized air from the brake activation control line 310 to flow freely to output port 321 and on to the pressure apportioning valve hardware 318, thereby activating brake pots 50 and associated braking mechanisms 52.

An optional one way check valve 327 may be provided along the brake activation supply line 310 in trailer 300 of FIG. 7. This check valve permits the flow of pressurized air into second control port 312 but not out of the second control port. The check valve 327 serves primarily to prevent a quick and easy reset of the braking system after VSA 380 has been activated. Once the VSA 380 is activated and the brake activation supply line 310 has been pressurized, the air trapped between the check valve 327 and the braking control valve assembly 334 acts to hold the service brakes in the applied position. This makes it more difficult for a hijacker to release the brakes in order to operate the truck. Even if the hijacker is able to release the service brakes by bleeding the pressurized air holding tank 40, he will still not be able to operate the vehicle's braking system since the shuttle valve 316 continues to be in the VSA-activated position of FIG. 10 preventing the use of the brake pedal valve 44. The check valve 327 and the portion of the supply line to the braking control valve assembly 334 are preferably located within the chassis of the trailer and are not easily accessible by an operator. By providing a one-way check valve 327, an operator cannot merely cut or break the brake activation supply line 310 at its junction with the VSA 380 to release the pressure at port 312 and restore operability to the brake foot pedal valve 44.

In a variation of trailer 300 of FIG. 7, the second type VSA 380 may not be connected to the spring brake pots 72, since the braking mechanisms 52 associated with the spring brake pots will be activated more strongly anyway by the brake pots 50 when the service brake activation supply line 310 is pressurized. The use, however, of the redundant application of the braking mechanisms as provided for in FIG. 3 increases the difficulty of someone deactivating the VSA 380 and/or resetting or repairing the braking system once the VSA has been activated. For instance, where an emergency braking subsystem is connected to the VSA, a hijacker cannot merely disconnect or block the brake activation 310 line prior to hijacking the truck to disable the VSA. The VSA can still activate the emergency brakes. Disconnecting the emergency braking subsystem is difficult since positive pressure must be maintained in the spring brake pots to prevent them from activating. For instance, if the shunt line 76 is blocked or cut, the pressurized air to the spring brake pots 72 is released and the associated braking mechanisms are applied. To effectively disable the VSA 380 concerning the emergency braking subsystem, a hijacker must first disconnect the shunt line 76 from the VSA and effectively splice it into one of the spring brake pot supply lines 74 and seal any leaks that might develop. In the time necessary to perform such an operation, law enforcement officials will have ample time to arrive on the scene to thwart the hijacking or prevent a VSA-disabled hijacker from completing a repair and continuing underway.

Figure 11:
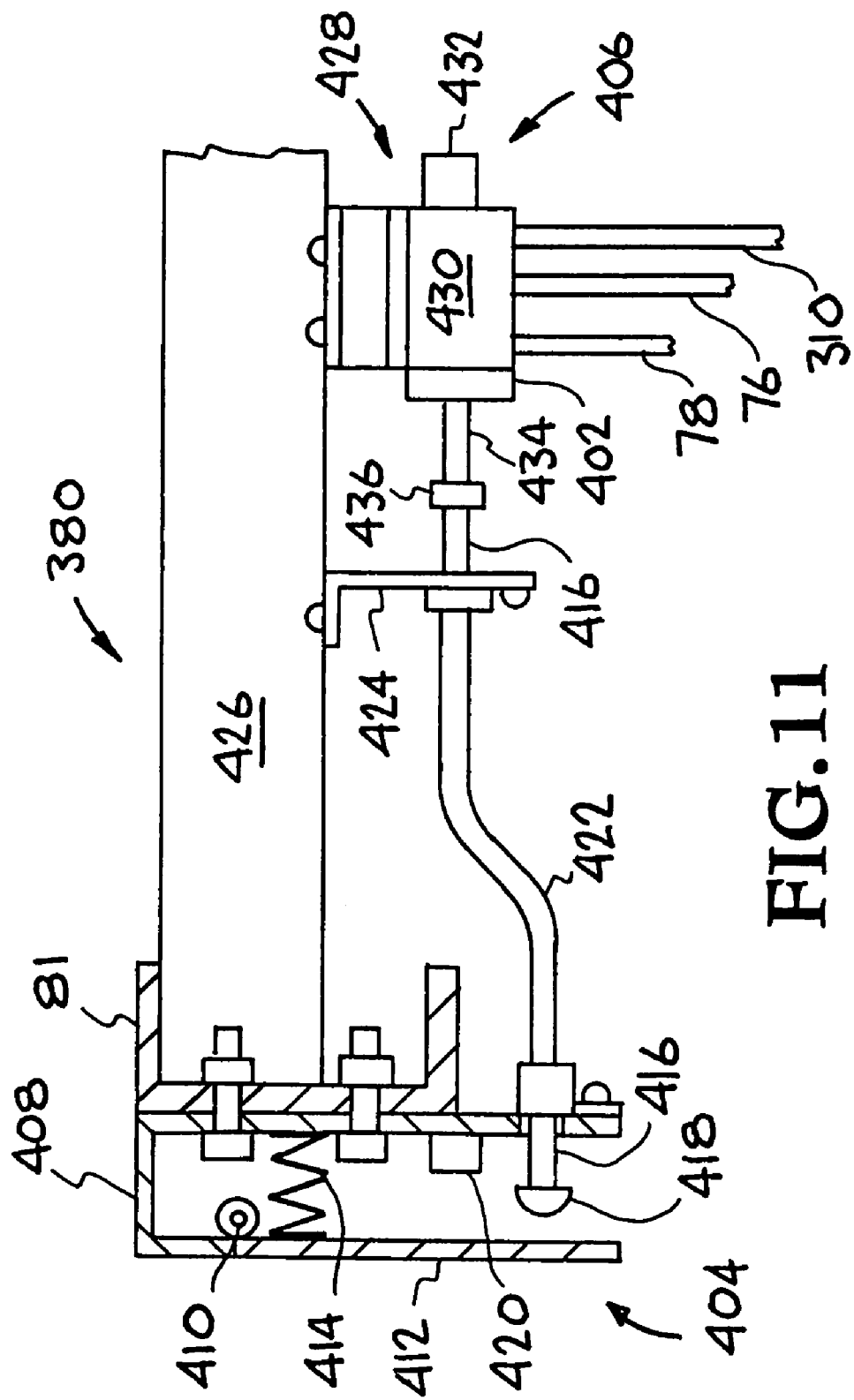
FIG. 11 is a side view of an embodiment of a second type VSA comprising an impact actuator mountable on a bumper of a vehicle and a valve assembly mountable to the chassis of a vehicle.

FIG. 11 illustrates a first embodiment second type VSA 380 that is configured to both exhaust the pressurized air in the spring brake pot supply lines 74 of the braking system of trailer 300 of FIG. 7 and also pressurize the brake activation supply line 310 causing the all the service brakes to be applied as well. The apparatus 380 also includes a impact counter 402 that is configured to require two or more impacts to the VSA before the braking system is activated.

The second type VSA 380 includes a bumper mounted portion 404 and a chassis mounted portion 406. The bumper mounted portion comprises an L-shaped mounting bracket 408 with a hinged edge 410 that is pivotally coupled with a remotely operable mechanism in the form of an impact plate 412. A spring 414 is provided spanning the distance between the plates and holding the impact plate in its first unactivated position. The spring is sufficiently stiff so that the impact plate will not pivot due to incidental contact between two vehicles or by a pedestrian bumping or being knocked into the VSA 380. One end of a flexible load transferring control cable 416 extends outwardly from the vertical portion of the mounting bracket proximate its bottom edge. The end of the cable can include an impact pad 418 to receive the force of the impact plate when it is pivoted. A stop block 420 may also be provided to forwardly limit the pivotal movement of the impact plate. A semi-rigid load transferring cable housing 422 is braced against and affixed to the backside of the vertical portion of the L-shaped mounting bracket. The cable housing extends to and is affixed to a metal bracket 424 that is attached to the trucks chassis 426. A hole extends through the metal bracket through which the other end of the control cable passes.

In addition to the metal bracket 424, the chassis mounted portion includes a brake actuation device having a valve assembly 428 that is fluidly coupled with shunt line 76, the spring brake pot supply lines 74 through shunt line section 78, and the brake activation supply line 310. In a preferred configuration the valve assembly includes an impact counter 402, one or more pressurized air redirection valves 430 for directing the flow of pressurized air, and a solenoid actuator 432. The impact counter includes a first shaft 434 that is attached to the end of the control cable through a coupling 436. Based on the configuration of the impact counter any number of hits against the impact plate that are transferred to the impact counter through the control cable may be required before the one or more valves are actuated to activate the braking system.

It can be appreciated that an impact counter 402 can be constructed from a great variety of pneumatic, hydraulic, or electrical components. For instance, pneumatic or hydraulic spool valves can be connected to perform any logical or arithmetic operation such as counting and actuating a mechanical device to produce a differential displacement of a mechanical shaft. Electronic logic circuits can be used to do the same.

Figure 12:
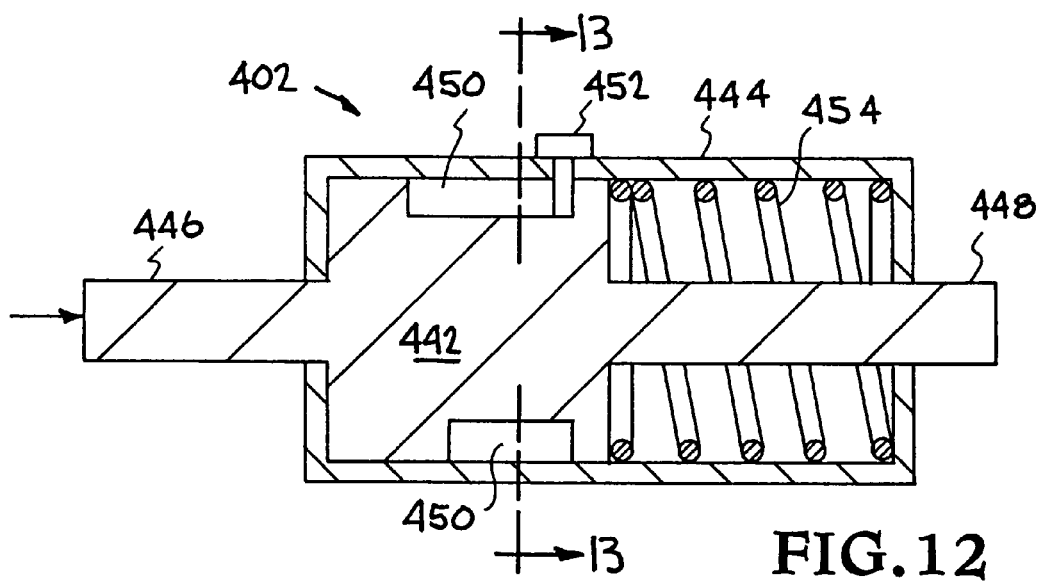
FIG. 12 is a cross-sectional view of an impact counter for use in conjunction with the valve assembly of the VSA of FIG. 11.
Figure 13:
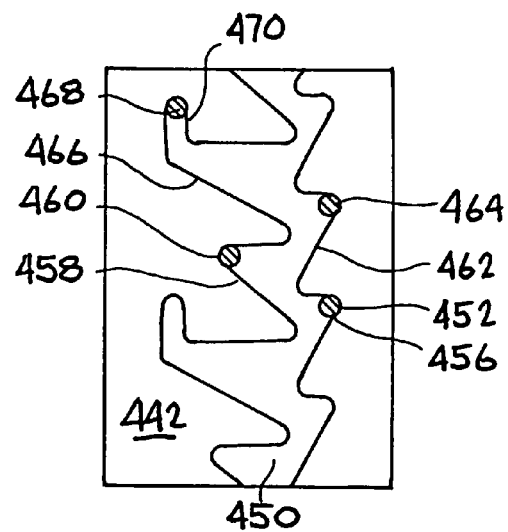
FIG. 13 is a circumferential cross-sectional view taken along the line 13-13 of FIG. 12 illustrating the configuration of the groove of the spiral ratchet mechanism.

A mechanical impact counter 402 that is particularly rugged and robust is shown in FIGS. 12 and 13. Counter 402 utilizes a spiral ratchet mechanism. A cylindrical cartridge 442 is slidably contained within a cylindrical housing 444. From a left opening in the housing, the first shaft 446 extends outwardly and is coupled with the end of the control cable 416 shown in the VSA 380 of FIG. 11. The first shaft and a corresponding second shaft 448 that extends outwardly of the other end of the housing are fixedly attached to the cartridge, sharing a common axis of rotation therewith. The cartridge and the two shafts are typically made from a metal and can be integrally fabricated. A continuous groove 450 is formed in the surface of the cartridge around its circumference, at 13-13 in FIG. 12 and as shown in FIG. 13, to receive a control pin 452 that is fixedly attached to the housing 444 as shown in FIG. 13. A spring 454 contained in the housing biases the cartridge to the left.

The positioning of the pin 452 in the continuous groove 450 controls the longitudinal displacement of the cartridge 442 and its associated shafts 446 and 448 within the housing.

The spiral ratchet and its operation is described in detail in U.S. Patent No. 5,445,230, entitled "Downhole Drilling Subassembly and Method for Same," issued on Aug. 29, 1995, which is hereby incorporated in its entirety. As shown herein, shaft 446 must receive two impacts before it will move to the right and lock in place to actuate the air redirection valves 430. The movement of the pin and the operation of the impact controller are best described with reference to FIG. 13, which illustrates the circumferential spiral groove 450 linearly. As noted above, it should be appreciated that the ends of the view of FIG. 13 are joined together as the spiral groove extends around the cartridge 442.

In its normal reset or home position pin 452 is biased by the spring 454 against a first right slot 456 in the groove 450. When a first impact is transferred to the first shaft 446, the cartridge 442 moves to the right with pin 452 being forced along a first sloped surface 458 in the groove. As the pin rides along the first sloped surface it causes the cartridge to rotate accordingly. The rightwardly motion of the cartridge is stopped when the pin impacts the left wall of a first left slot 460. The longitudinal displacement between the first left and right slots is not sufficient to actuate the one or more valves and the braking system is not activated by the VSA 380. Next, the cartridge is biased leftwardly by the spring 454 once the first impact force is removed. The pin rides along the second sloped surface 462 causing the cartridge to rotate until it is seated in the second right slot 464. If a second impact of sufficient force is received, the cartridge is again move rightwardly with the pin riding against the third sloped surface 466 rotating the cartridge accordingly until being stopped when the pin impacts the left wall of the second left slot 468. The displacement between the second left and right slots is sufficient to cause the valves to be actuated and cause the braking system to be applied. When the impact force subsides, the spring attempts to bias the cartridge back to it leftmost position but the cartridge is held in place by the pin impinging against a right substantially vertical wall 470 of the second left slot 468, thereby effectively locking the impact counter in the valve actuating position.

As provided in the illustrated impact counter of FIG. 13, the one or more valves 430 are actuated after two impacts. However, by modifying the configuration of the continuous spiral groove it is possible to increase the minimum number of impacts before the cartridge and the second shaft 448 are displaced to the right a sufficient distance to actuate the one or more valves. Depending on the diameter of the cartridge, the groove 450 can be configured to include upwards of at least 8 complete cycles on a small diameter cartridge before actuating the one or more valves.

Once the predetermined number of hits is recorded by the impact counter, the valves 430 are actuated to activate both the service brakes and the emergency braking subsystem. Simply stated, the air redirection valves 430 when actuated cause the spring brake pot supply lines 74 to be exhausted to atmosphere causing the spring brakes 72 to apply the associated braking mechanisms 52, and cause the brake activation line 310 to be pressurized to cause the service brakes to be fully applied. Two valve configurations are described in greater detail below.

Figure 14:
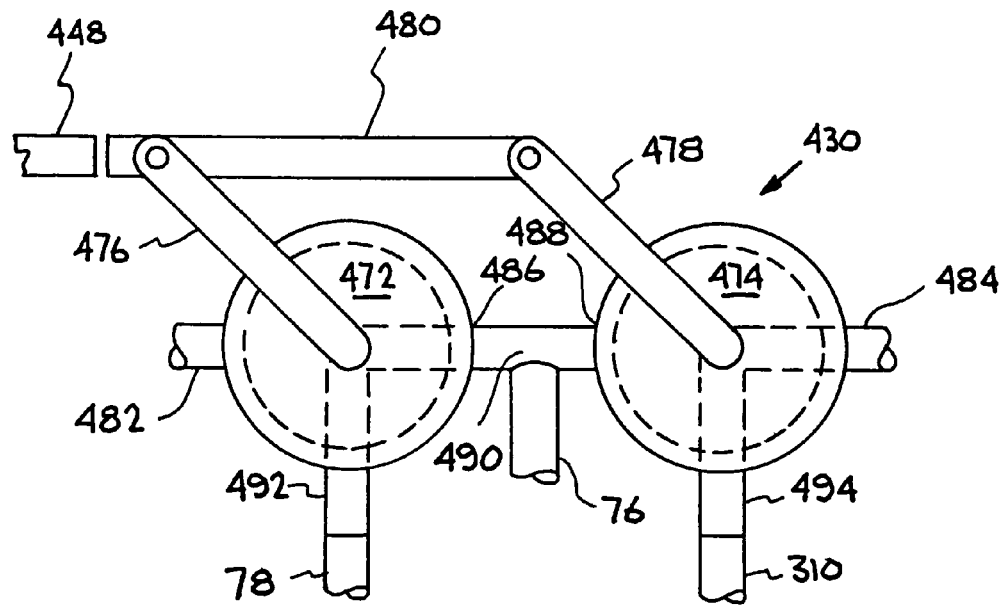
FIG. 14 is a cross-sectional view a first type of valve assembly that can be utilized with the VSA of FIG. 11, showing the valve assembly in its normal operating position.
Figure 15:
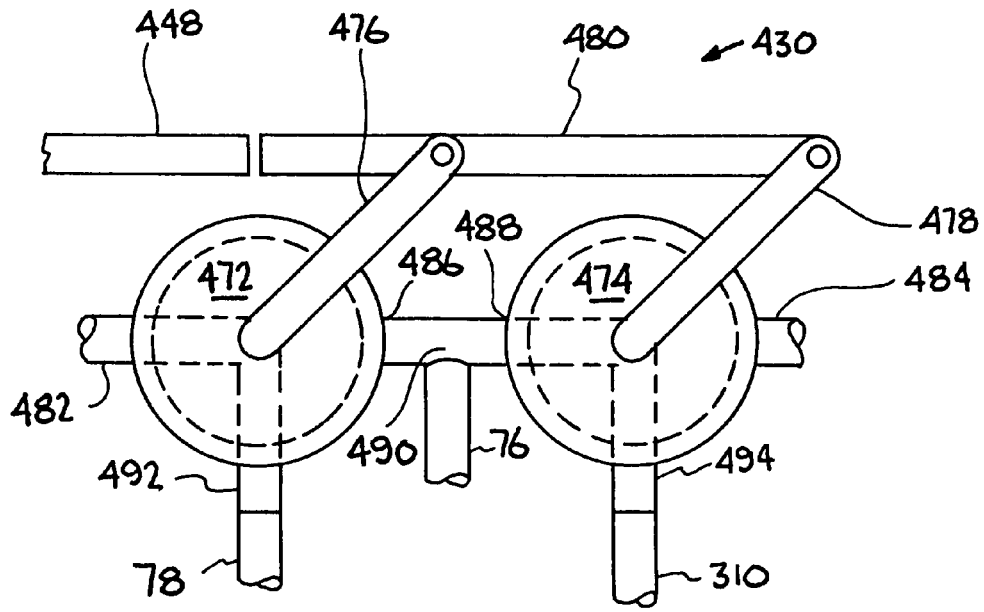
FIG. 15 is a cross-sectional view a first type of valve assembly that can be utilized with the VSA of FIG. 11, showing the valve assembly in its VSA-activated position.

FIGS. 14 and 15 illustrate two coupled gate valves 472 and 474 that can comprise one or more pressurized air redirection valves 430 to activate the emergency braking subsystem and the service brakes of the braking system of trailer 300 of FIG. 7. Gates valve levers 476 and 478 pivotally couple the valves with an actuating rod 480. The left end of the actuating rod interfaces with the right end of the second shaft 448 of the impact counter 402 to transfer the longitudinal displacement of the counter once the impact plate has been hit with sufficient force the requisite number of times, for example, two for counter 402. Each valve includes three ports. The first port of each valve is an exhaust port 482 and 484. The second port 486 and 488 is coupled to a coupling air line 490 that joins the two valves together. The third port 492 on the first valve 472 is coupled to shunt line section 78, which leads to the spring brake pots 72, while the third port 494 on the second valve 474 is coupled to the brake activation supply line 310. The coupling air line in turn is fluidly connected to the shunt line 76.

FIG. 14 is an illustration of the two valves when the second type VSA 380 is in its normal non-activated state. The shunt line section 78 is fluidly coupled with the primary shunt line 76 through the first valve 472, permitting pressurized air into the spring brake pots 72 thereby preventing activation of the emergency braking system. Further, the brake activation supply line 310 is exhausted to atmosphere through the second valve 474, such that the operator of the tractor trailer rig has full control of the service brakes through the foot pedal valve 44.

When the second shaft 448 of the impact counter 402 is displaced longitudinally to the right putting the VSA 380 in the activated state, the actuator rod 480 pushes the levers 476 and 478 of the gang valves into their second position as illustrated in FIG. 15. In this position the first valve 472 exhausts the shunt line section 78, which is connected to the spring brake pot supply lines 74 to atmosphere causing the spring brake pots 72 to activate along with the emergency braking subsystem. Further, the brake activation supply line 310 is coupled with the primary shunt line 76, through the second valve 474 causing the service brakes to be activated. It is appreciated that although the first and second gate valves are shown as two separate valves they could be combined into a single valve housing with a single actuating lever and perform the same function.

In one configuration of the valve assembly 428 utilizing the gate valves of FIGS. 14 and 15, the second shaft 448 and the actuator rod 480 are longitudinally coupled together such that movement of one longitudinally results in movement of the other. Accordingly, when the impact counter 402 is reset, the gate valves move back into their normal position as well, causing the service brakes and the emergency brakes to be released. In another configuration, the actuator rod 480 is not fixedly connected to the second shaft 448. Rather, they merely abut each other when the VSA 380 is activated. Accordingly, resetting the impact counter does not pull the actuator rod back into in a position wherein the gate valves return to their normal non-actuated position. The brakes remain applied until both the impact counter and the gate valves are both independently reset. In this configuration, resetting the VSA 380 is very time consuming and could prevent a hijacker from re-enabling the braking system before law enforcement authorities are able to apprehend the hijacker.

In other variations, the gate valves 472 and 474 can be enclosed in a locked box contained in the chassis to prevent tampering or resetting by anyone who does not have the key or know the combination to the lock. The gate valves of FIGS. 14 and 15 have been described for use in valve assembly 428 of the first embodiment second type VSA 380 as illustrated in FIG. 11 in conjunction with an impact counter 402. It is appreciated that the gate valves of FIG. 14 could also be used in an embodiment of the second type VSA wherein no impact counter is utilized and the actuator rod 480 is directly coupled with the control cable 416.

Figure 16:
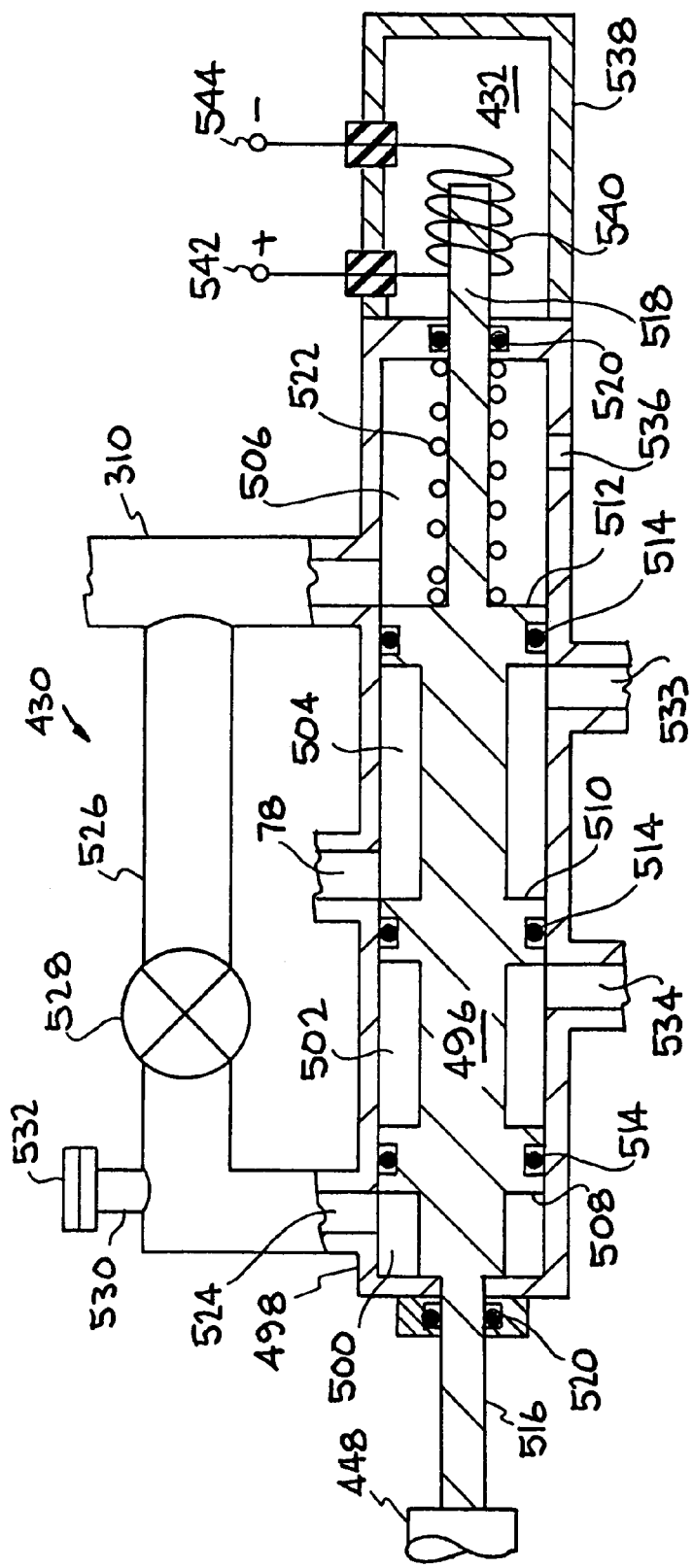
FIG. 16 is a schematically cross-sectional view of a second type of valve assembly that can be utilized with the VSA of FIG. 11, showing the valve assembly in its normal operating position.
Figure 17:
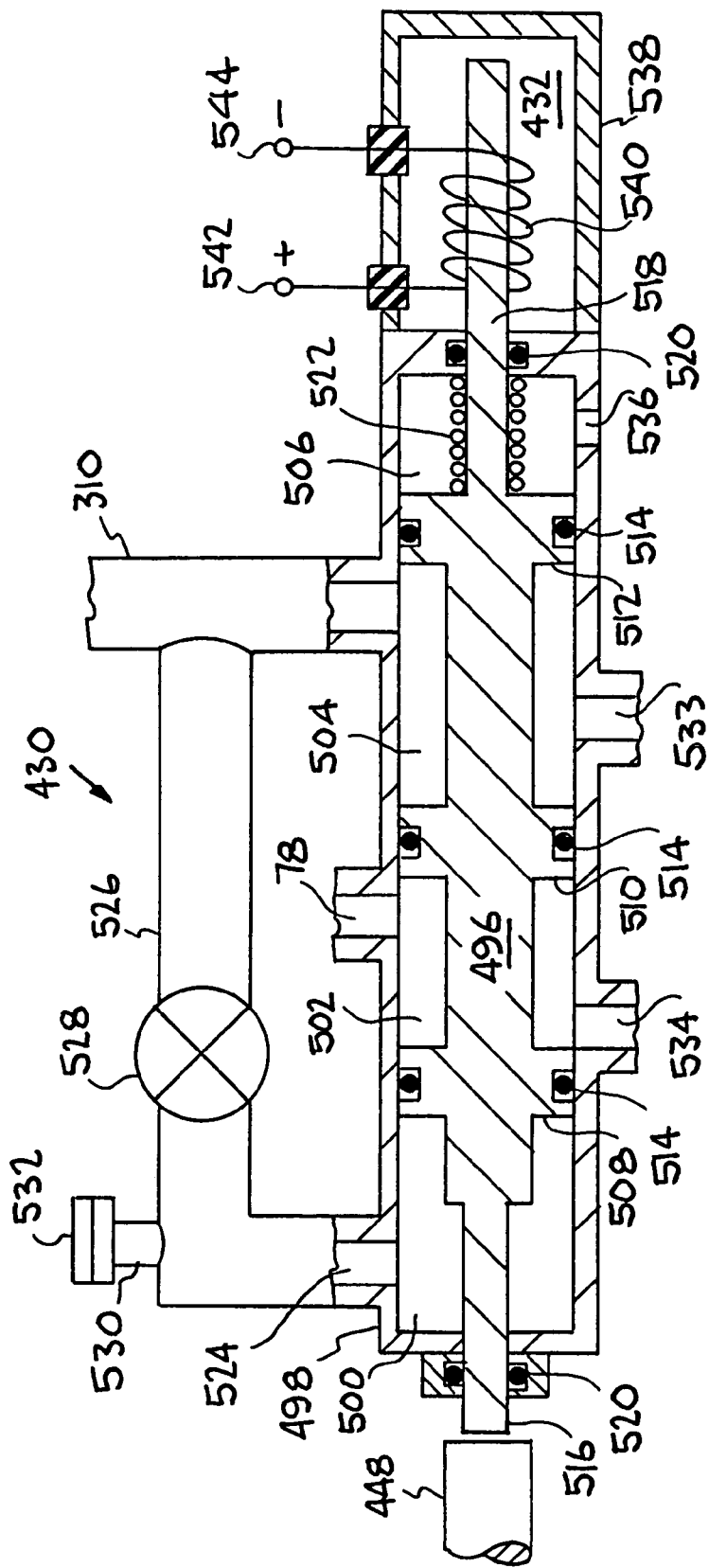
FIG. 17 is a schematically cross-sectional view a second type of valve assembly that can be utilized with the VSA of FIG. 11, showing the valve assembly in its VSA-activated position.

A spool valve assembly can also be utilized in place of the two gate valves in the valve assembly 428 of FIG. 11 described above to accomplish the activation of both the service brakes and the emergency braking subsystem of the trailer 300 shown in FIG. 7. One air redirection valve assembly 430 incorporating a spool valve is illustrated in FIGS. 16 and 17.

The spool valve includes a substantially cylindrical valve body 496 slidably contained within a valve housing 498. A plurality of air cavities 500, 502, 504 and 506 are formed between the outside surface of the valve body and the inside surface of the valve housing. Flanges 508, 510 and 512 that extend radially beyond the nominal surface of the air cavities separate the air cavities. The flanges have a diameter just slightly smaller than the inside diameter of the valve housing. Seals 514 are provided at the circumferential sides of the flanges to seal each air cavity so that pressurized air from one cavity does not bleed into another cavity. Left and right shafts 516 and 518 are fixedly attached to the ends of the valve body and extend outwardly from the valve body through openings provided in the ends of the valve housing. Seals 520 are provided at the openings to prevent pressurized air in the adjacent cavities from bleeding through the opening. Preferably, the right shaft 518 is comprised of a ferromagnetic material, such a steel or iron, to facilitate activation of solenoid 432, which is described in detail below. A spring 522 is provided within the housing to the right of the valve body and acts to bias the valve body leftwardly.

An air supply inlet 524 is provided into the leftmost first air cavity 500. Inlet 524 is connected to a bypass air supply line 526 that is coupled with the brake activation supply line 310. A manually actuatable bypass valve 528 is provided inline along the bypass air supply line 526 to permit or hinder the flow of pressurized air from the brake activation line into the first cavity 500. Further, an auxiliary port 530 may be provided between the inlet port 524 and the bypass valve to permit pressurization of the first cavity by alternative means. Normally, a cap 532 seals port 530.

The second air cavity 502 is separated from the first air cavity 500 on its left by the first flange 508 and associated seals 514 and from the third air cavity 504 on its right by the second flange 510 and associated seals 514. In the normal position, a port 533 connected to shunt line 76 opens into the third cavity 504 and pressurizes shunt line 78 also connected to third cavity 504.

An outlet port 534 is provided into the second cavity that is exhausted to atmosphere. In the actuated position of the valve body 496 within the valve housing 498 that is achieved after the VSA 380 has been activated as shown in FIG. 17, shunt line 78 that normally feeds the spring brake pot supply lines 74 opens into the second cavity now connected to the exhaust port 534. Thus, the emergency brakes are applied when the VSA is activated.

The third air cavity 504 is separated from the fourth air cavity 506 on its right by the third flange 512 and associated seals 514. Inlet port 533 connected to the primary shunt line 76 extends through the valve housing and opens into the third cavity 504 in both the normal position and in the VSA activated position of the valve body 496. When the valve body 496 is in its normal or rest position, shunt line 78 opens into the third cavity permitting pressurized air from the shunt line 76 to be supplied to the spring brake pots 72 during normal braking system operation. When the valve body 496 is in its actuated position as shown in FIG. 17, service brake control line 310 opens into the third cavity and is pressurized by shunt line 76. Shunt line 78 is exhausted through the second cavity now connected to the exhaust port 534.

The fourth air cavity 506 is bounded on the right by the right end of the valve housing 498 and contains the spring 522 that biases the valve body leftwardly. An exhaust outlet port 536 to atmosphere is provided into the forth cavity in both the normal and activated positions of the valve body. When the VSA 380 is in its normal state as shown in FIG. 16, the brake activation supply line 310 opens into the fourth air cavity connected to the exhaust port 536, thus exhausting all pressure in the VSA service brake activation line 310.

FIG. 16 illustrates the spool valve in normal or rest position when the second type VSA 380 has not been activated and the trailer 300 of FIG. 7 is in its normal operating mode. Pressurized air from the third primary supply line 66 of the trailer 300 is fed to the primary shunt line 76. Line 78 is connected by the third air cavity 504 of the spool valve to the shunt line section 78 to feed pressurized air to the spring brake pots 72 through the spring brake pot supply lines 74. Additionally, the brake activation supply line 310 is vented to atmosphere through the fourth air cavity 506 and the associated exhaust port 536.

The spool valve is actuated when the second shaft 448 of the impact counter 402 is driven to the right when the VSA 380 has been hit the requisite number of times. The second shaft of the impact counter pushes the left shaft 516 of the valve body to the right as well, thereby compressing the biasing spring 522 and moving the valve body into its rightmost position as illustrated in FIG. 17. In the actuated position, pressurized air flows from the primary shunt line 76 through the third cavity 504 and into the brake activation supply line 310 to cause the automatic activation of the service brakes. If the bypass valve 528 is opened, pressurized air is also directed through the bypass air supply line 526 into the first air cavity 500 so that the pressurized air holds the valve body in its actuated position. If the bypass valve is closed, no pressurized air will enter the first cavity to hold the spool valve in the actuated position. Rather, the spool will remain in the actuated position so long as the impact counter 402 is in the actuated position with the second shaft 448 holding the valve body 496 in its rightmost position. Once the impact counter 402 is reset, the valve body will return to its normal position. As discussed above concerning the two gate valves, it may be desirable to require both the impact counter and the spool valve to be independently re-settable thereby increasing the difficulty and time required to restore the braking system to its normal configuration. As can be appreciated in a variation of the first embodiment second type VSA 380 without an impact counter, the pressurization of the first cavity 500 is necessary to hold the spool valve actuated.

When the spool valve is in the actuated position as shown in FIG. 17, the shunt line section 78 that feeds pressurized air to the spring brake pots 72 is vented to atmosphere through the second air cavity 502 and exhaust port 534. Accordingly, the emergency braking subsystem is also activated.

The solenoid 432 is provided at one end of the spool valve as shown in FIGS. 16 and 17. The solenoid comprises a housing 538 containing a solenoid coil 540 therein. An opening is provided in the left end of the housing through which the right ferromagnetic shaft 518 of the spool valve passes. Two electrical connections 542 and 544 of the coil extend from the solenoid housing for connection to a DC power source and a control circuit. When a current is passed through the coil, the magnetic attraction between the coil and the ferromagnetic left shaft 518 pulls the valve body into the position illustrated in FIG. 17, thereby causing the service brakes and the emergency braking subsystem to be activated. It is appreciated that by providing a radio or laser receiving device to control the application of power to the solenoid a second method of remotely applying the vehicle's brakes, other than impacting the bumper mounted portion of the second type VSA 380 of FIG. 11, is provided. Further, the solenoid may be coupled with a operator accessible switch in the cab or other location on the truck to permit the operator to disable the vehicle so as to thwart a hijacker or other unwanted operator.

Figure 18:
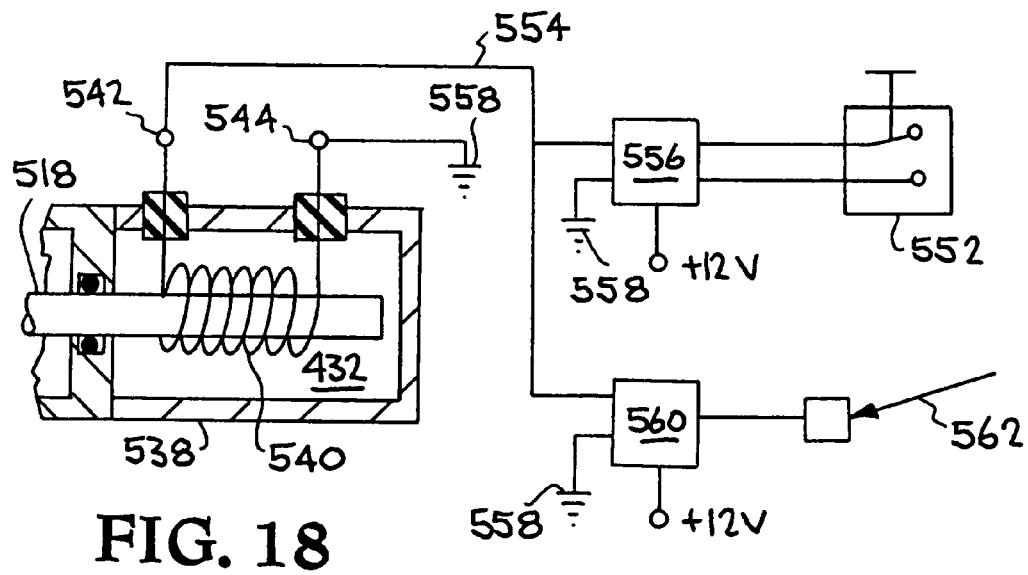
FIG. 18 is a schematical illustrating a circuit for use in the remote control of the valve assembly of FIG. 16.

Referring to FIG. 18, a schematical illustration of the solenoid control circuit is provided showing both a switch operated and a remote perpetrated solenoid actuating means. Both of these means may be included with a particular valve assembly 430 of the second type VSA 380 of FIG. 11 or only one of the two means may be coupled with the solenoid 432. In the switch operated means, a switch 552 is typically located in the cab of the vehicle or in another location known to the operator of the vehicle. The switch is coupled electronically to a delay circuit 556 that delays applying direct current power to solenoid 432 until after a predetermined delay time span has passed. Then delay circuit 556 activates an internal relay (not shown) that connects the positive current power supply line 554 to connector 542 which activates solenoid 432. The delay circuit is coupled with a direct current power supply. The power supply may be the primary electrical system of the vehicle or the delay circuit may be powered by its own battery that cannot be easily accessed by or disabled by a potential hijacker. Typically, the negative connectors of the solenoid and the delay circuit are grounded on the chassis 558 of the vehicle.

A delay circuit is utilized to permit a truck operator whose vehicle is being hijacked to activate the disabling circuit prior to being forced from the vehicle without the hijackers being made aware of his action. Presumably, the operator can escape from the scene before the delay circuit activates and renders the vehicle inoperative, thereby avoiding the hijacker's retribution. The switch 552, or an additional switch, may also be located on the outside of the vehicle as well.

Additionally or alternatively, the solenoid 432 can be electrically coupled with a radio or laser signal receiver 560. The receiver is coupled to its own or the vehicle's direct current power source and is adapted to receive radio or laser signals 562 from a remote source. Preferably, the signals are coded and signal receiver 560 includes a decoder for decoding the signals and, accordingly, activating the braking system.

It is appreciated that coupling the switch 552 and/or delay circuit 556 to the solenoid would normally require at least one electrical line 554 to be run from the cab where the switch and/or delay circuit might be located to the solenoid, which is typically located in the trailer 33 of a tractor trailer rig. Adding extra electrical lines to all the trucks on the road is not reasonable or practical. An alternative solution is illustrated in FIG. 19, wherein control signals, such as a signal to activate the VSA spool valve 430, in the form of alternating current can be sent from the tractor 31 to the trailer 33 over the direct current power lines 564 already connecting the tractor with the trailer, which direct current electrical lines for lights and accessories are standard on all trucks, trailers and other vehicles.

Figure 19:
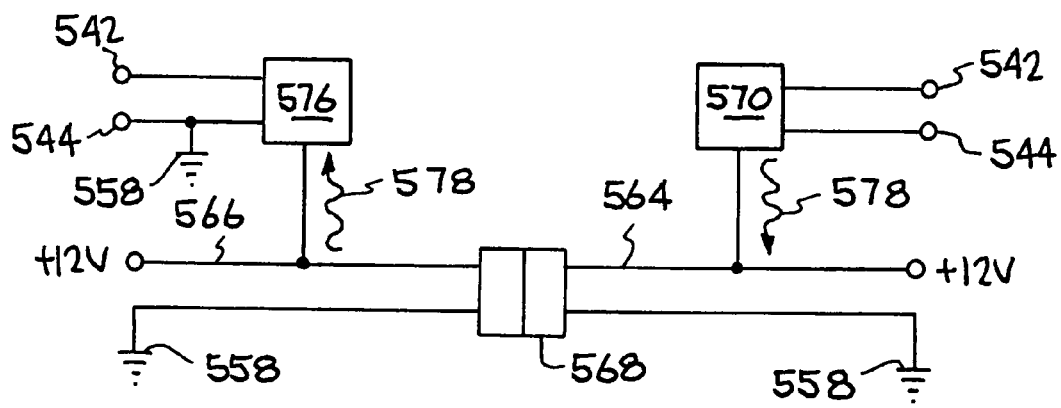
FIG. 19 is a schematical illustrating a circuit for using in transmitting coded signals from one section of a truck (such as a tractor) to another (such as a trailer).

In FIG. 19, the main power direct current line 564 of a tractor is connected to the main power lines 566 of the trailer through a standard connector plug 568. An alternating signal generator and coding device 570 is coupled to truck direct current power line 564. Alternating signal 578 is impressed on line 564. Signal 578 appears on the trailer power line 566 where it is received by decoder 576. A relay inside decoder receiver 576 closes its contacts whenever the coded signal 578 is received by decoder 576. This relay (not shown) can be used to activate any electrical device such as the solenoid 432 of FIG. 18.

A switch in the truck cab can be used to activate the signal generator 570 in FIG. 19. For example, the signal generator and receiver combination 570 and 576 of FIG. 19 can be inserted between switch 552 and solenoid 432 or FIG. 18 to active the VSA spool valve of FIG. 16.

Operationally, the vehicle driver triggers the delay circuit 556 by activating the associated switch 552. After the predetermined period of time, the delay circuit 556 activates the coding device 570, which generates a code and sends an alternating current signal 578 carrying the code over the positive power line 564. The decoding device 576, which continuously monitors the positive power line for signals, identifies and decodes the signal. If the code matches the activation code of the device, the associated relay is tripped and power is supplied to the solenoid 432 causing the associated VSA 380 to be activated. It is appreciated that alternating current signaling and decoding devices are well known, inexpensive and reliable.

Figure 20:
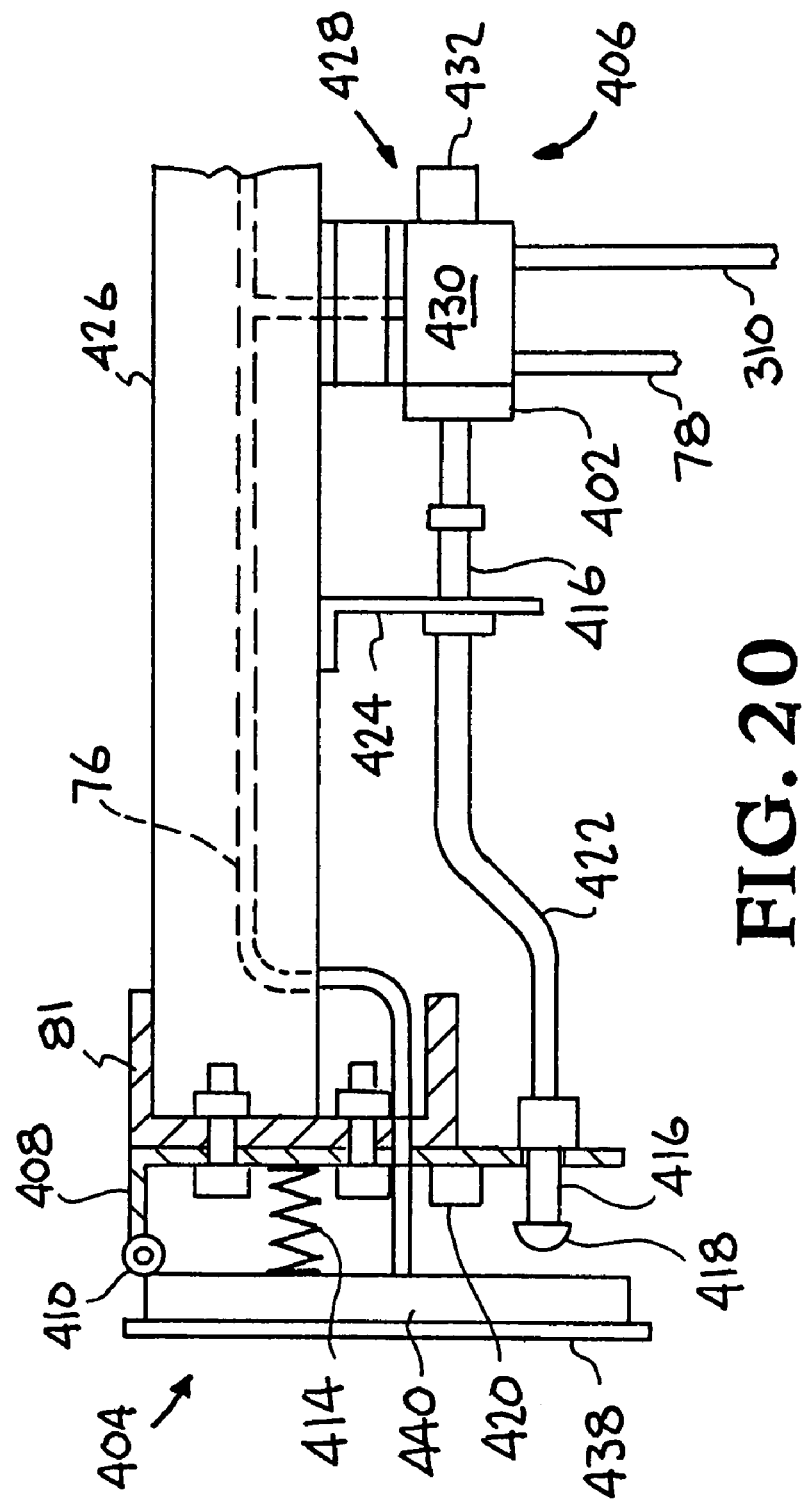
FIG. 20 is a side view of another embodiment of a second type VSA comprising a pressure vessel impact actuator mountable to a bumper of a truck and a valve assembly mountable to the chassis of the truck, wherein the VSA is configured to be activated by impact with another vehicle or by weapon's fire.

A second embodiment second type VSA 380' that in most respects is similar to the first embodiment second type VSA 380 of FIG. 11 is illustrated in FIG. 20. The impact plate 412 of FIG. 11 is replaced with a "radiator-style" pressure vessel 440 of the type similar to the pressure vessel 118 described for the first type VSA 80'" of FIG. 5. A preferred pressure vessel 440 is approximately one-foot square and an inch thick. The pressure vessel is hingeably connected to the mounting plate 408 and is fluidly coupled to the shunt line 78 of the third embodiment braking system of FIG. 3. Accordingly, the pressure vessel permits activation of the VSA 380' through a suitable number of impacts to cause the impact counter 402 and the valve assembly 430 to apply both the emergency braking system and the service brakes, and through the release of pressure to the shunt line 76 when the pressure vessel is punctured by weapons fire, thereby causing the emergency braking subsystem to be activated. In a preferred configuration, the face of the pressure vessel includes a hazardous waste placard 438 to help conceal the pressure vessel from view and provide law enforcement officials with a highly visible target.

Figure 21:
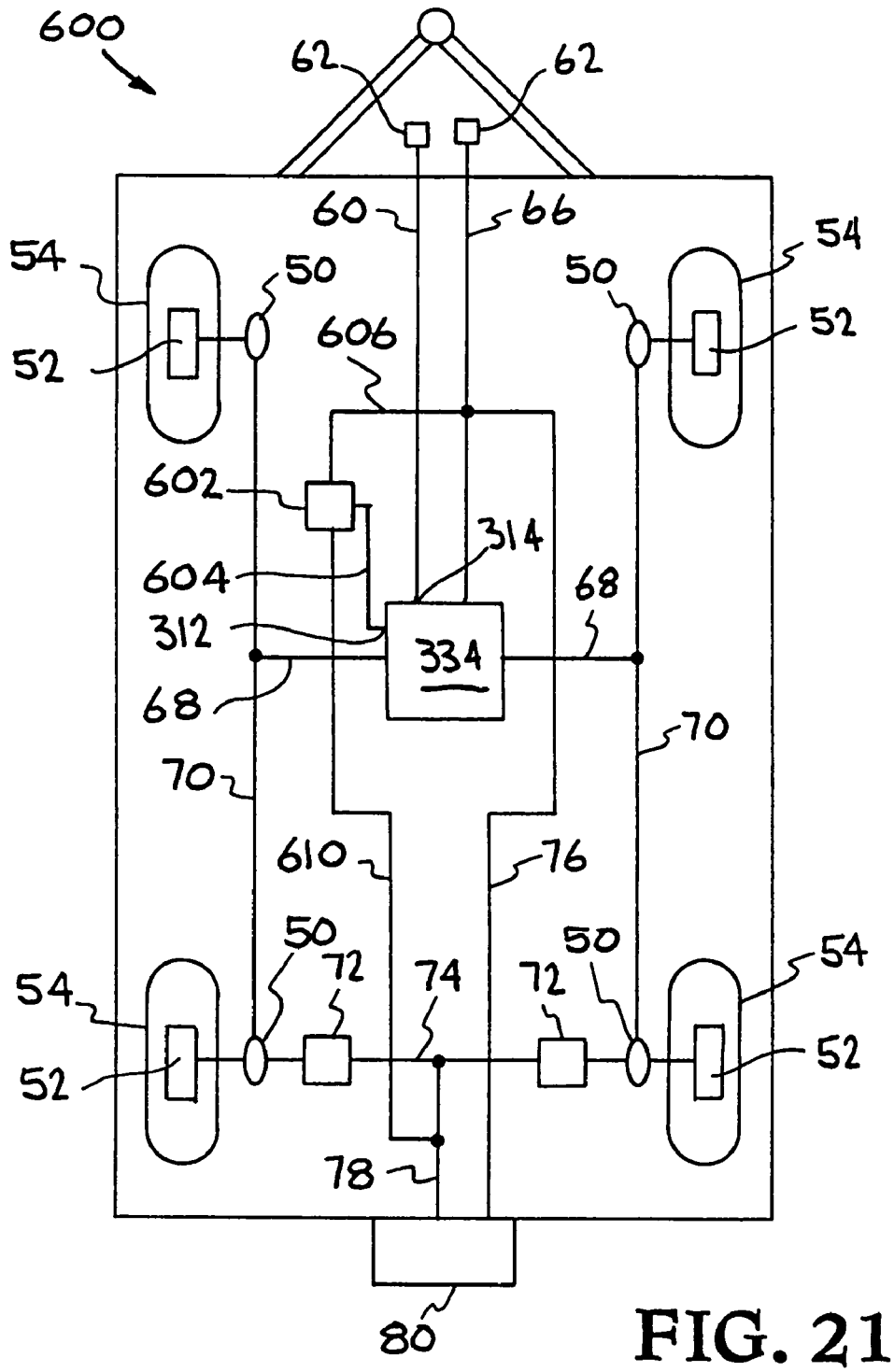
FIG. 21 is a schematically illustrated tractor trailer showing a braking system incorporating a first type VSA using an air pressure inverting valve.

The braking system of trailer 600 in FIG. 21 functions in essentially the same manner as the braking system of trailer 300 in FIG. 7 in that both the service brakes and the emergency braking subsystem are activated when a vehicle stopping apparatus is activated. However, unlike the brake activation line 310 of trailer 300 of FIG. 7, the brake activation line section 610 is pressurized and is fluidly coupled with the shunt line 78 at one end. Accordingly, activation of the VSA 80 exhausts the pressurized air from the brake activation line 610 opposed to pressurizing the line as in the trailer 300 of FIG. 7. The other end of the brake activation supply line 610 is fluidly coupled to a standard inverter valve 602. A second brake activation supply line 604 extends from the inverter valve to the second control port 312 of the trailer braking control valve assembly 334. Further, a second shunt line 606 extends from the third primary supply line 66 to another port in the inverter valve. A simple first type VSA 80, such as those provided in FIGS. 2-5, can be utilized with this trailer wherein the VSA 80 merely exhausts the pressurized lines 78 and 610 that are coupled with it when activated. However, using a simplified valve as in VSA 80 requires the addition of the inverter valve 602 in order to accomplish all the functions of VSA 380 in FIG. 11.

Operationally, inverter valve 602 supplies no air pressure at it is output port 604 when there is air pressure at its input port line 610. Inverter valve 602 supplies maximum air pressure at its output port 604 when there is no air pressure at its input line 610. The inverter valve 602 supplies pressurized air to the brake activation supply line section 604 via the second shunt line 606 whenever the pressure in the first brake supply line 610 is exhausted by the activation of the VSA 80. The trailer braking control valve assembly 334 is similar to the braking control valve assembly of trailer 300 of FIG. 7, wherein pressurized air is provided to the brake pots 50 via the brake pot supply lines 74 when pressurized air is provided to a shuttle valve (not shown) through the second control port 312.

Figure 22:
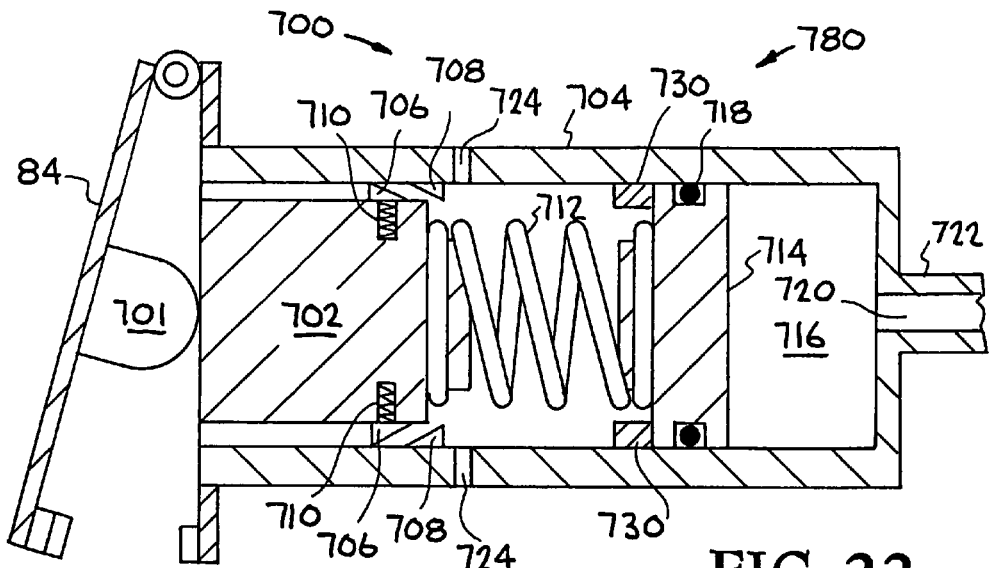
FIG. 22 is a cross sectional view of an impact device for use in a third VSA adapted to activate a hydraulic braking system.
Figure 23:
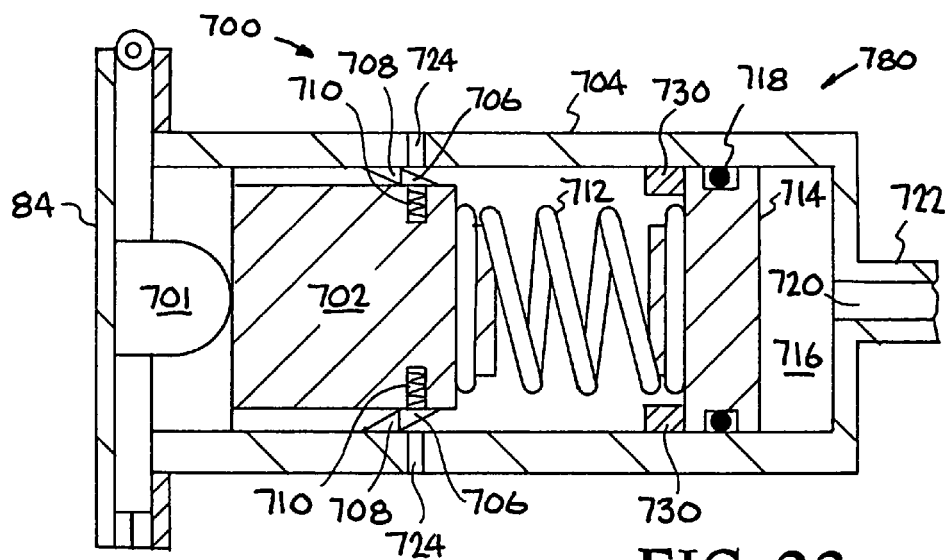
FIG. 23 is a cross-sectional view similar to FIG. 22 showing the impact device in its activated configuration.

A third type vehicle stopping apparatus 780 for use in connection with a braking system of a truck or other vehicle having a hydraulic braking system (not shown) is illustrated in FIGS. 22 and 23. "Air over hydraulic" braking systems are common in medium sized trucks with the service brakes being activated by hydraulic means and the emergency and parking brakes being activated by a pneumatic system utilizing spring brake pots such as described above in reference to trailer 30 of FIG. 1. As can be appreciated any of the previously described VSA embodiments can be utilized to activate the emergency braking system, however a modified VSA is required to activate the hydraulic service brakes.

In FIG. 22, an impact device 700 is adapted for mounting behind on a mounting plate 82 of a bumper-mounted VSA such as the first embodiment first type VSA 80 of FIG. 2. Accordingly, when activated through an impact with an impact plate 84 hingeably connected to the mounting plate in a manner similar to VSA 80 as shown in FIG. 2, the hydraulic brakes are activated and held in the activated position. As shown in FIG. 22, an impact block 701 is provided to ensure good contact with the front face of an impact plunger 702 of the impact device 700. The plunger 702 is slidably mounted in a front portion of a cylindrical impact device housing 704. Outwardly biased plunger stop latches 706 are mounted on the outside of the plunger and are configured to permit unhindered rearward movement of the plunger in the housing. Mating housing stop latches 708 are mounted on and protrude from the inside of cylindrical housing's bore. The plunger stop latches 706 are, biased outwardly by springs 710 such that these latches will recess into the interior of the plunger 702, allowing the plunger latches to pass freely by housing latches 706 as plunger 702 moves into housing after an impact. Once the plunger latches have slid past the housing latches, the plunger latches are configured to spring outwardly. The rear face of the plunger is in contact with a force transfer spring 712 that is in contact with a hydraulic piston 714 at its other end. Stop blocks 730 are rigidly attached to the cylindrical housing 704. Stops blocks 730 prevent piston 714 from moving backward in housing 704 under the normal hydraulic pressure in cavity 716, thus not relieving the hydraulic pressure in the braking system connected to cavity

716 by line 722. The force transfer spring is typically in a lightly biased or unbiased in its normal inactivated state as shown in FIG. 22. The backside of the hydraulic piston is in contact with a fluid reservoir 716 containing hydraulic brake fluid. Seals 718 are provided around the outside of the piston to prevent hydraulic fluid from seeping out of the reservoir. At the back end of the housing a port 720 is provided that is coupled with a hydraulic supply line 722 which in turn is coupled to the associated braking mechanisms.

In the normal inactivated position of the impact device 700 no pressure is transferred from the device to the hydraulic brake mechanisms through the hydraulic brake line 722. However, when the impact plunger 702 through the impact block 701 is pushed forward in the housing, the force transfer spring 712 is biased. The force associated with this bias is applied to the piston 714 and ultimately the incompressible hydraulic fluid, which causes the brakes to be applied. It is appreciated that the force required to push the plunger 702 into its locked position of FIG. 23 is dependent on the force transfer spring. Ideally, to prevent the unwanted or incidental locking of the vehicle's brakes, a force of at least about 200 lbs is required to lock the plunger in the activated and locked position of FIG. 23. Once the impact force subsides the force transfer spring attempts to bias the plunger back into its normal inactivated position, however, vertical surfaces of the housing and plunger stops 706 and 708 contact and abut each other holding the plunger in its activated position. Accordingly, the force transfer spring remains in a biased condition as shown in FIG. 23. It continuously exerts a force on piston 714 which acts to hold the displaced fluid from the reservoir 716 in an associated reservoir of the braking mechanisms effectively locking the braking mechanisms of the service brakes in an activated condition. The service brakes are not released until the impact device 700 is reset. To reset the brakes, two apertures 724 are provided through the housing just above the plunger stop latches when the plunger is in the activated position. By inserting a wire into the apertures 724 and using the wire to depress the plunger stop latches 706 so as to permit the latches to pass by the housing stop latches 708, the plunger 702 can return to its normal inactivated position shown in FIG. 22.

In a variation of the impact device of FIG. 22 designed for remote activation upon receipt of a radio or laser signal, the impact plate can be replaced with a suitable solenoid which is activated in much the same manner as described above with respect to the second type VSA 380 of FIG. 11.

Figure 24:
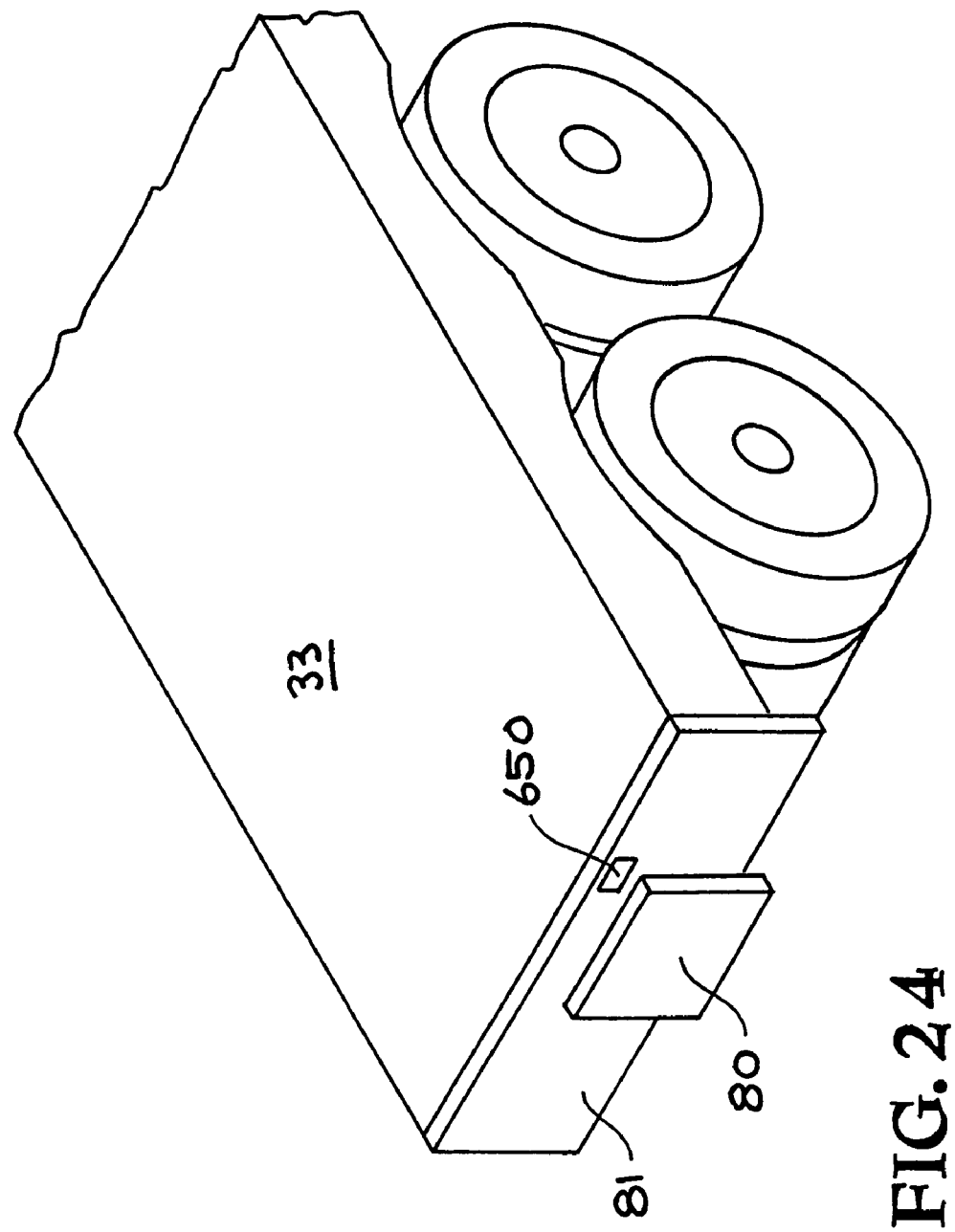
FIG. 24 is an illustration of an indicator flag attached to a VSA.

The utility of any of the various vehicle stopping apparatus 80 described herein, that is at least partially mounted to a bumper 81 of a vehicle, is enhanced if there is some visible signal to law enforcement officials that the VSA is operable and ready to stop the truck when activated by someone outside the truck. FIG. 24 illustrates a VSA 80 mounted on the bumper 81 of a truck or trailer 33 with a visible flag 650 or lighted status indicator that signals when the VSA 80 is operable and ready to be activated by any means. Alternatively, the light or flag may only be visible when the VSA 80 is not operational. The flag indicator 650 can be actuated by positive air pressure inside the VSA thereby verifying that shunt line 76 is providing a pressurized supply air to the VSA and has not been cut, blocked, or otherwise disconnected by someone who wants to disable the VSA. Ideally, law enforcement can view the flag indicator from a distance (like a license plate) and determine whether the VSA is operable.

A visible operational status indicator above can easily be incorporated in all the truck stopping apparatus embodiments described for this invention. Further, a non-visual indicator may also be incorporated in to one or more of the VSA embodiments. For instance, a pressure transducer could be coupled to a radio transmitter that would indicate to someone in another vehicle that tunes into the right frequency whether the VSA is operational or not.

Each of the vehicle stopping apparatus described heretofore can be permanently incorporated into the braking system of the vehicle and are actuated at least in one mode by impacting a portion of the apparatus, whether from another vehicle hitting a portion of the VSA or by weapons fire puncturing a pressure vessel of the VSA. Under certain circumstances, it is preferable to have a remotely activated portable VSA that can be easily attached to a tractor trailer rig and immediately provide the ability to remotely stop the vehicle.

Figure 25:
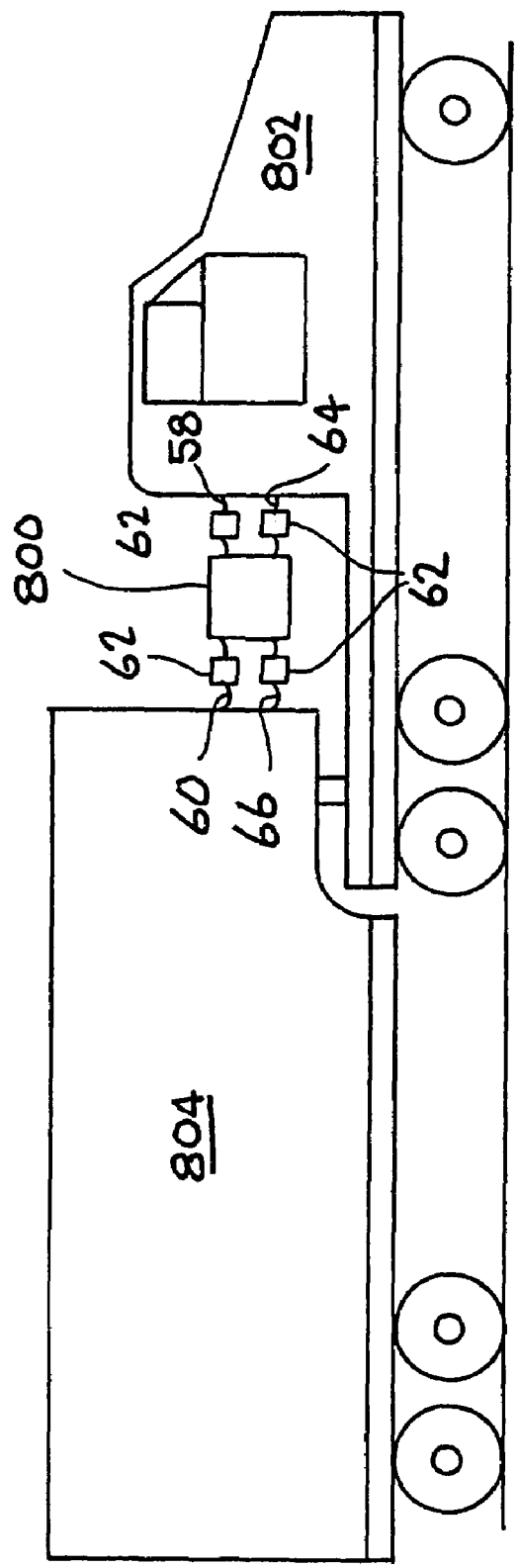
FIG. 25 is a tractor trailer rig incorporating a third type portable remote controlled VSA.
Figure 26:
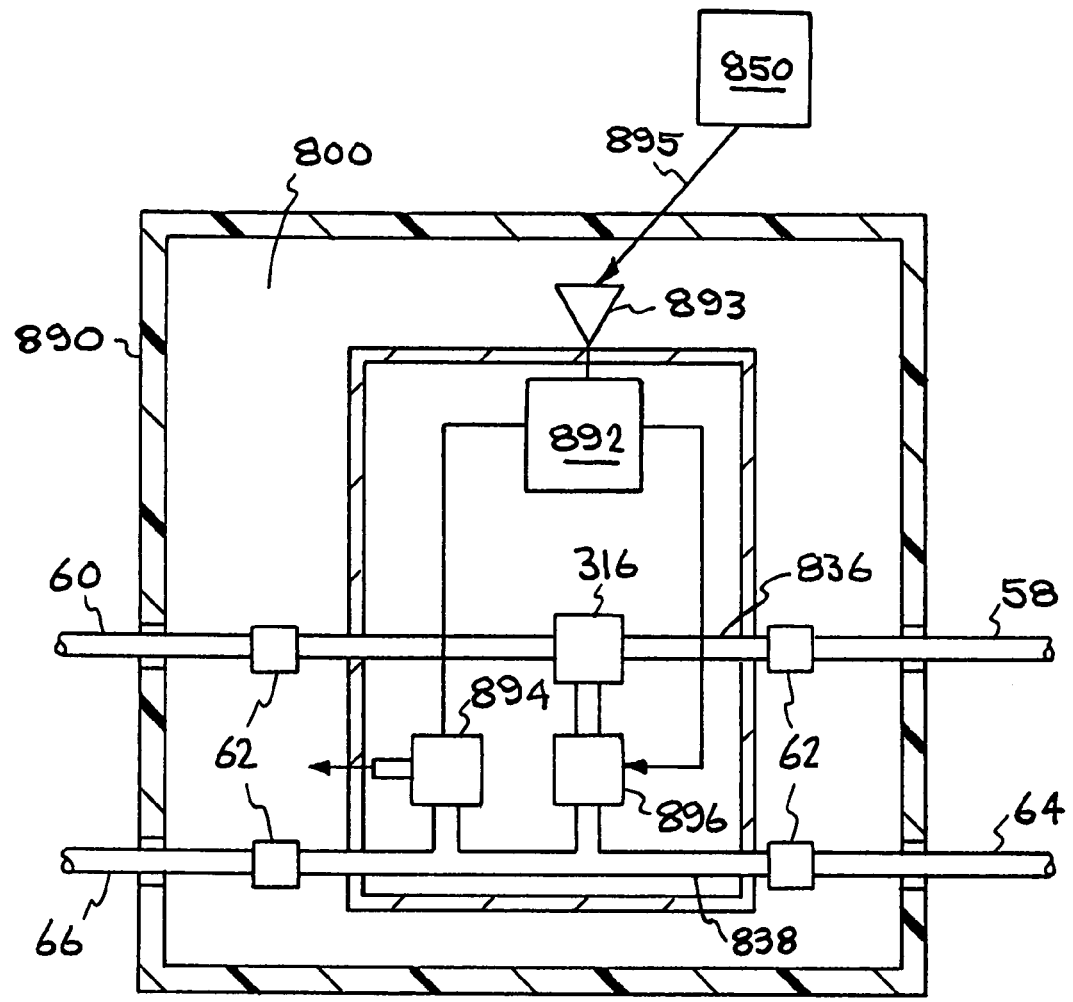
FIG. 26 is a schematical illustration of the portable remote controlled VSA of FIG. 25.

FIG. 25 is an illustration of one embodiment of a portable VSA actuatable from a remote source. Portable VSA 800 is coupled to the air brake lines of a truck or other vehicle by interfacing with the standard Gladhand connectors 62 customarily utilized to connect the brake lines of a tractor 802 to a trailer 804. As illustrated in FIG. 26, the primary brake air supply line 64 from the tractor 802 is coupled to a corresponding primary line 838 passing through the VSA 800. The other end of the primary line is coupled to the second primary brake air supply line 66. Similarly, the first pedal valve supply line 58 from the tractor is connected to a corresponding control line 836 of the apparatus 800 and the other end of the primary control line is coupled with the second pedal valve supply line 60 going to the trailer 804. Preferably the VSA is enclosed in a lock box 890 that is securely fastened to the tractor 802. Strong plastic and/or fiberglass-reinforced boxes permit the antenna to be mounted inside the box since the box is transparent to radio waves. It is preferable that the Gladhand connections be made inside the box as shown in FIG. 26 such that the VSA is not easily disconnected by persons without the key or combination to the lock on the box 890. A security box of no larger than 1 cubic foot has been found to be suitable to house all the hardware of the apparatus 800.

As shown in FIG. 26, a remotely operable mechanism such as receiver 892, which includes a controller, is provided with a suitable antenna 893 to receive radio signals 895 from a suitable remote source such as triggering device 850. The receiver is electronically coupled to two electronically activated valves 894 and 896. The receiver's controller includes a processor, memory and associated logic necessary to decode the received signals and to control the activation of the brakes on truck 802 and/or trailer 804. First valve 894 is configured to exhaust the air from the primary line 838 to atmosphere and second valve 896 is configured to redirect pressurized air from the primary line 838 to the control valve line 836 through a shuttle valve 316 that is essentially identical in function to the shuttle valve 316 of trailer 300 in FIG. 7. Valves 894 and 896 are included within the brake actuation device of VSA 800. Typically, the VSA 800 includes its own batteries to supply power to it.

When VSA 800 is in its normal operating configuration, air from the supply line 64 passes unhindered to line 66, and the foot pedal valve control line 58 passes unhindered to line 60 so that the braking system of the truck operates in a completely conventional fashion. However, if a coded signal 895 is received directing the VSA to apply the brakes, the receiver 892 can open the first valve 894, exhausting the air in the primary brake air supply lines 838, causing the pressure therein to drop, wherein the emergency brakes of the trailer are applied in the manner described with reference to the braking system of trailer 300 of FIG. 7. Further, the second valve 896 can be activated to direct pressurized air to the shuttle valve 316 causing air at maximum pressure to be directed to the trailer braking control valve assembly through the second foot pedal supply line 60, wherein the control valve assembly applies the service brakes with maximum force. In normal operation, only the service brakes are activated. However, the remote operator can send out another differently coded signal that cause application of only the emergency brakes or that causes both sets of brakes to be applied simultaneously. It is to be appreciated that if the vehicle's driver attempts to disable the service brakes when they have been applied by the VSA by cutting off the main air supply in line 66, the emergency brakes on at least the trailer are activated as the pressure in the associated spring brake pots is released.

The remotely controlled apparatus 800 can be utilized in at least a positive control mode, and a negative control mode. In the positive control mode, the VSA 800 is only activated when a coded signal is received from a remote source, causing one or more of the electronically controlled valves 894 and 896 to be activated. In the negative control mode the receiver is configured to receive continuously broadcast coded deactivation signals in order to prevent the VSA from being activated. If the VSA fails to receive a deactivation signal for a set period of time, such as several seconds, the receiver causes either or both of the electronically activated valves 894 and 896 to be activated, thereby applying the vehicle's brakes.

In general, the use of a VSA and the modified braking systems incorporating a VSA have been described in terms of stopping a hijacked vehicle as it is driven down the highway. It is appreciated, however, that radio controlled vehicle stopping apparatus 380, such as the VSA of FIG. 11 and the remotely controlled VSA 800 of FIG. 26, can be utilized to protect critical facilities, structures and areas by automatically disabling any VSA controlled vehicle that breaches a safety or controlled zone around the facility or structure. A remotely controlled portable VSA such as FIG. 26 can be installed on any truck entering or operating within a controlled zone in a matter of minutes as shown in FIG. 25.

Figure 27:
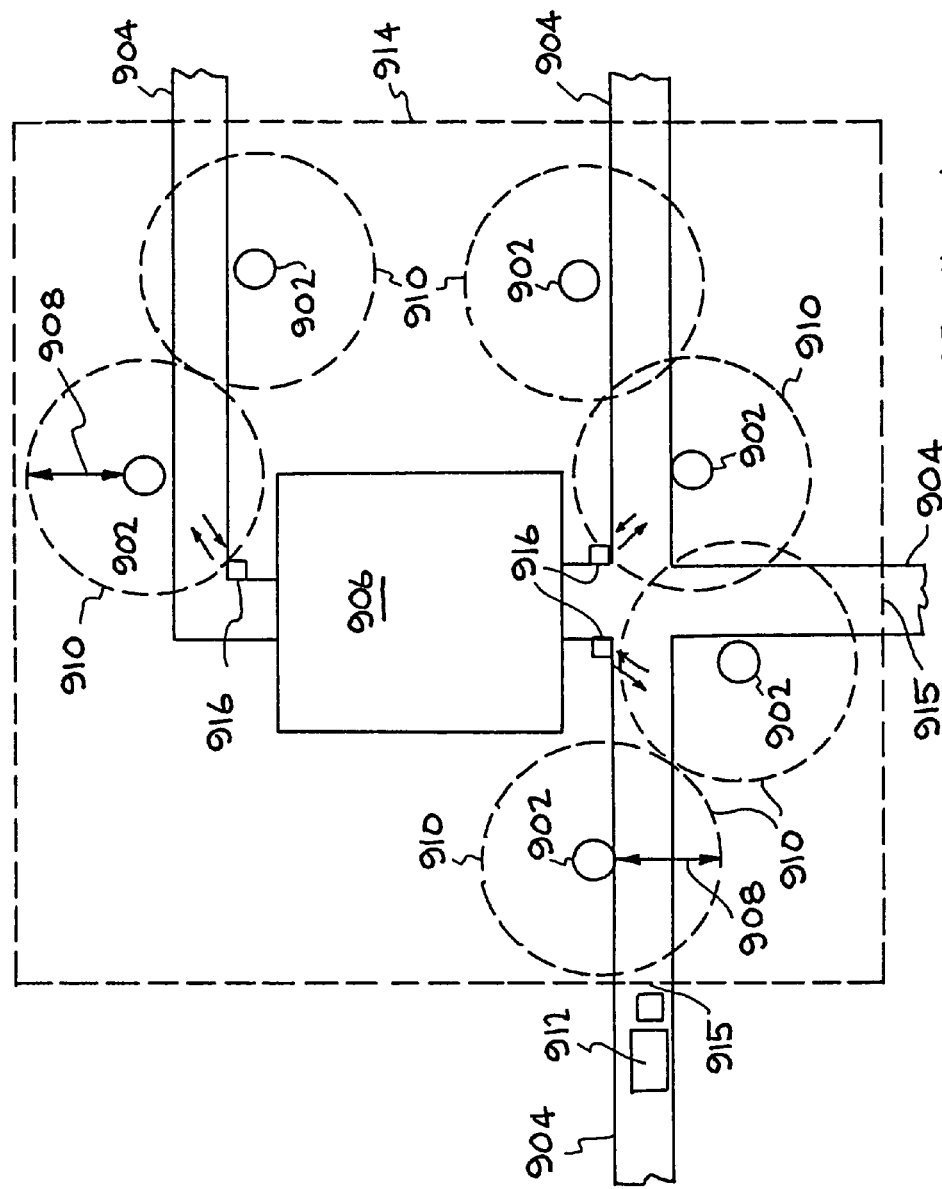
FIG. 27 illustrates a configuration of radio transmitters for use in controlling VSA equipped vehicles within the transmission range of the transmitters when vehicles are operating in the vicinity of a critical zone.

In one embodiment shown in FIG. 27, a plurality of radio control transmitters 902 are situated proximate the access roads 904 to a control or critical zone such as a critical facility 906. Each transmitter has an effective range 908 capable so that all the transmitters effectively cover the access roads as they lead to the facility. They transmit a coded signal 910 over their effective range that will remotely activate any radio controlled VSA passing into range of the signals to stop the vehicle 912. In a first operational mode, the transmitters 902 are continuously broadcasting the coded activation signal 910 so that no VSA-equipped vehicle may enter the safety or critical zone 906. In a second operational mode, the coded signals are only transmitted when security personal or surveillance equipment identify or perceive a threat. As also shown in FIG. 27, the surveillance equipment can include electric fences 914 with sensors to indicate an object passing through associated gates 915 and/or radar speed detectors 916. For instance, if a truck or other vehicle passes through an electrical fence 914 guarding critical facility 906, a signal is sent to the transmitters to transmit the coded signal to activate the VSA on this truck or on all trucks. If the truck exceeds a maximum allowable speed, the radar speed detectors trigger the transmitters to activate the VSA in the truck and stop it.

In another operational mode, the truck is permitted to operate within a protected or critical zone so long as it is receiving a coded deactivation signal from one or more transmitters 902. If the truck fails to receive the deactivation signal for any reason, the VSA is activated. This negative control mode has desirable anti-tamper or fail-safe features. An approaching truck 912 is stopped by the VSA mounted on the truck anytime the driver or any other source, such as a deliberate jamming transmission or random radio interferences, blocks the reception of proper radio signals from transmitters 902 longer than some specified time. Negative control can also be used to define a safety zone by placing transmitters 902 far enough away from the safety zone such that trucks entering the safety zone cannot receive coded radio signals. In this case, trucks with installed radio controlled VSA apparatus can only operate in an area in which they can receive a proper radio signal from the transmitters.

For the purposes of explanation, numerous specific details have been set forth in the foregoing description in order to provide a thorough understanding of the present invention. The detailed description and embodiments discussed herein are not intended to limit the scope of the invention as claimed. To the contrary, embodiments of the claims have been contemplated that encompass the full breadth of the claim language. Accordingly, the present invention may be practiced without some of the specific detail provided herein.

For example, the VSA of FIG. 11 is described in terms of use with the braking system of trailer 300 of FIG. 7. It is appreciated, however, that by simply modifying the routing of the air lines into and out of the described valve assemblies (see FIGS. 14, 15, 16, and 17), one can adapt the VSA for use with the other types of braking systems. Additionally, although the solenoid 432 and associated remote radio and or laser signal control of a VSA was discussed only concerning the valve assembly of the VSA of FIG. 11 that incorporates a spool valve 430, remote control features using the solenoid can be incorporated into most if not all of the VSA embodiments as desired with appropriate modification. It is to be further appreciated that many of the features, components, and methods of use described in relation to a particular embodiment or variation of the invention may be utilized with other embodiments of the invention as well.

What is claimed is:

1. A vehicle-stopping apparatus for use with a remote device and first and second vehicles each having a plurality of wheels rotatably carried by a body and a fluid pressurized braking system having a first conduit fluidically coupled to a fully-pressurized braking fluid source and a second conduit fluidically coupled between a foot pedal valve and a plurality of service braking mechanisms so as to permit remote stopping of the vehicle when the vehicle is traveling on a roadway, comprising a portable assembly adapted for use on the first and second vehicles and having a brake actuation device and a remotely operable controller, the brake actuation device being provided with a first device conduit having first and second ends and a second device conduit having first and second ends and a valving mechanism coupled between the first device conduit and the second device conduit, the portable assembly being configured for sequential securement to the first and second vehicles by having a compact size and shape and including a pair of first connector means carried by respective ends of the first device conduit for detachably coupling the first device conduit to the first conduit of the vehicle so as to permit fully-pressurized fluid to travel through the brake actuation device and a pair of second connector means carried by respective ends of the second device conduit for detachably coupling the second device conduit to the second conduit for permitting selectively pressurized fluid from the foot pedal valve to travel through the brake actuation device, the remotely operable controller being operably configured to control the brake actuation device and adapted for receiving electromagnetic control signals from the remote device for causing the valving mechanism to direct fully-pressurized fluid from the first conduit to the second conduit so as to activate the plurality of service braking mechanisms to provide maximum braking force for stopping the vehicle whereby the portable assembly can be used to retrofit the vehicle and inhibit hijacking of the vehicle.

2. The apparatus of claim 1, wherein the valving mechanism comprises an actuator valve controlled by the remotely operable controller for directing fully-pressurized braking fluid from the pressurized braking fluid source to the second device conduit.

3. The apparatus of claim 2, wherein the valving mechanism further comprises a shuttle valve actuated by the flow of frilly-pressurized braking fluid thereto from the actuator valve.

4. The apparatus of claim 1, wherein the pair of first connector means and the pair of second connector means are each hand-operable connectors.

5. The apparatus of claim 1, wherein the second conduit is a foot pedal valve supply line in fluidic communication with the fully-pressurized braking fluid source by way of the foot pedal valve controlled by an operator of the vehicle to apply various levels of service braking force to said wheels.

6. The apparatus of claim 1, further comprising a compact portable container for housing the brake actuation device and the remotely operable controller and having first access portals for receiving the first conduit and second access portals for receiving the second conduit so that connections with the first and second connector means are located inside the container.

7. The apparatus of claim 6, wherein the container is a lock box.

8. The apparatus of claim 1, further comprising a portable housing surrounding the brake actuation device and the remotely operable controller, with the first and second connector means being accessible from outside the housing.

9. The apparatus of claim 8, further comprising a portable container for containing the housing, the brake actuation device, and the remotely operable controller and having access portals for permitting entry of the first and second conduits into the container so that connections with the first and second connector means are located inside the container.

10. The apparatus of claim 9, wherein the container is a lock box.

11. The apparatus of claim 1, wherein the remotely operable controller activates the brake actuation device upon receiving an electromagnetic control signal from the remote device.

12. The apparatus of claim 1, wherein the remotely operable controller activates the brake actuation device upon failing to receive an electromagnetic control signal from the remote device.

13. The apparatus of claim 1, wherein the fluid pressurized braking system has a plurality of emergency braking mechanisms coupled to the second conduit for respectively decelerating the plurality of wheels, the brake actuation device including means for depressurizing the second conduit downstream of the brake actuation device for activating the plurality of emergency braking mechanisms.

14. The apparatus of claim 13, wherein the means for depressurizing includes an exhaust valve in fluidic communication with the second conduit downstream of the brake actuation device and operably connected to the remotely operable controller.

15. A vehicle-stopping apparatus for use with a remote device and first and second vehicles each having a plurality of wheels rotatably carried by a body and a fluid pressurized braking system including a fully-pressurized braking fluid source and a plurality of service braking mechanisms for respectively decelerating the plurality of wheels so as to permit remote stopping of the vehicle when the vehicle is traveling on a roadway, comprising a portable assembly adapted for use on the first and second vehicles and including a container valve means and a remotely operable controller disposed within the container, the container being configured for sequential securement on the first and second vehicles by having a compact size and shape and connector means disposed within the container for detachably coupling the valve means between the fully-pressurized braking fluid source of the vehicle and the plurality of service braking mechanisms so that the portable assembly can be used to modify the fluid pressurized braking system of the vehicle and inhibit hijacking of the vehicle, the valve means being configured to direct fully-pressurized braking fluid from the fully-pressurized braking fluid source to the plurality of service braking mechanisms upon actuation for providing full braking force by the plurality of service braking mechanisms to stop the vehicle when the vehicle is traveling on the roadway and the remotely operable controller being operably connected to the valve means and adapted for receiving electromagnetic control signals from the remote device for controlling the actuation of the valve means.

16. The apparatus of claim 15 for use with a fluid pressurized braking system having a plurality of emergency braking mechanisms, wherein the portable assembly includes an additional valve means detachably coupled between the valve means and the plurality of emergency braking mechanisms and wherein the remotely operable controller is operably connected to the additional valve means for directing the additional valve means to depressurize the braking system at the plurality of emergency braking mechanisms so as to activate the plurality of emergency braking mechanisms and thus enhance stopping of the vehicle.

17. The apparatus of claim 15 for use with a vehicle having a tractor and a trailer, wherein the portable assembly includes a plurality of fluid conduits coupled to the valve means and terminating at the respective connectors means for permitting the valve means to be coupled to the fluid pressurized braking system between the tractor and the trailer.

* * * * *